US012637611B2

(12) United States Patent (10) Patent No.: US 12,637,611 B2
Gordon et al. (45) Date of Patent: May 26, 2026

(54) PROPPANT PARTICULATES FORMED FROM DELAYED COKE AND METHODS RELATED THERETO

(71) Applicant: ExxonMobil Technology and Engineering Company, Spring, TX (US)

(72) Inventors: Peter A. Gordon, Yardley, PA (US); Lang Feng, New York, NY (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/690,637

(22) PCT Filed: Oct. 12, 2023

(86) PCT No.: PCT/US2023/035050
§ 371 (c)(1),
(2) Date: Mar. 8, 2024

(87) PCT Pub. No.: WO2024/102224
PCT Pub. Date: May 16, 2024

(65) Prior Publication Data
US 2025/0263599 A1 Aug. 21, 2025

Related U.S. Application Data

(63) Continuation-in-part of application No. 18/558,780, filed as application No. PCT/US2022/070811 on Feb. 24, 2022.
(Continued)

(51) Int. Cl.
C09K 8/80 (2006.01)
E21B 43/267 (2006.01)

(52) U.S. Cl.
CPC .............. C09K 8/80 (2013.01); E21B 43/267 (2013.01)

(58) Field of Classification Search
None
See application file for complete search history.

(56) References Cited

U.S. PATENT DOCUMENTS

| | | | |
|---|---|---|---|
| 1,754,765 A | 4/1930 | Parr et al. | |
| 3,089,542 A | 5/1963 | Kolodny | |
| (Continued) | | | |

FOREIGN PATENT DOCUMENTS

| | | | |
|---|---|---|---|
| CA | 684454 A | 4/1964 | |
| CA | 2863283 A1 | 3/2015 | |
| (Continued) | | | |

OTHER PUBLICATIONS

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.
(Continued)

*Primary Examiner* — Anuradha Ahuja
(74) *Attorney, Agent, or Firm* — Troutman Pepper Locke LLP; John A. Mossissett; Scott A. Bergeson

(57) ABSTRACT

Proppant particulates like sand are commonly used in hydraulic fracturing operations to maintain one or more fractures in an opened state following the release of hydraulic pressure. Fracturing fluids and methods of hydraulic fracturing may also use proppant particulates composed of petroleum coke material. Such proppant particulates may
(Continued)

have improved transport into fractures because of lower density than traditional proppants like sand and may produce fewer fines that reduce fluid flow through proppant packs. The proppant particulates of the present disclosure are composed of thermally post-treated delayed coke and exhibit mechanical properties comparable to fluid coke and flexicoke petroleum coke materials for use as proppant particulates.

26 Claims, 9 Drawing Sheets

Related U.S. Application Data

(60) Provisional application No. 63/382,968, filed on Nov. 9, 2022, provisional application No. 63/186,987, filed on May 11, 2021.

(56) References Cited

U.S. PATENT DOCUMENTS

| | | | |
|---|---|---|---|
| 3,283,817 A | 11/1966 | Roberts |
| 3,659,651 A | 5/1972 | Graham |
| 3,661,543 A | 5/1972 | Saxton |
| 3,664,420 A | 5/1972 | Graham et al. |
| 3,700,032 A | 10/1972 | Terry et al. |
| 3,702,516 A | 11/1972 | Luckenbach |
| 3,707,462 A | 12/1972 | Moss |
| 3,759,676 A | 9/1973 | Lahn |
| 3,816,084 A | 6/1974 | Moser et al. |
| 4,036,750 A | 7/1977 | Jaros et al. |
| 4,213,848 A | 7/1980 | Saxton |
| 4,269,696 A | 5/1981 | Metrailer |
| 4,741,840 A | 5/1988 | Atherton et al. |
| 4,796,701 A | 1/1989 | Hudson et al. |
| 4,957,174 A | 9/1990 | Whitfill et al. |
| 5,189,102 A | 2/1993 | Tsubuko et al. |
| 5,215,143 A | 6/1993 | Gentry |
| 5,472,596 A | 12/1995 | Kerby et al. |
| 5,604,184 A | 2/1997 | Ellis et al. |
| 5,889,137 A | 3/1999 | Hutchings et al. |
| 5,899,272 A | 5/1999 | Loree |
| 6,016,879 A | 1/2000 | Burts, Jr. |
| 6,035,936 A | 3/2000 | Whalen |
| 6,059,034 A | 5/2000 | Rickards et al. |
| 6,283,212 B1 | 9/2001 | Hinkel et al. |
| 6,330,916 B1 | 12/2001 | Rickards et al. |
| 6,720,290 B2 | 4/2004 | England et al. |
| 6,825,152 B2 | 11/2004 | Green |
| 7,073,581 B2 | 7/2006 | Nguyen et al. |
| 7,210,528 B1 | 5/2007 | Brannon et al. |
| 7,237,609 B2 | 7/2007 | Nguyen |
| 7,249,500 B2 | 7/2007 | Dutton et al. |
| 7,255,169 B2 | 8/2007 | van Batenburg et al. |
| 7,270,879 B2 | 9/2007 | McCrary |
| 7,325,608 B2 | 2/2008 | van Batenburg et al. |
| 7,334,635 B2 | 2/2008 | Nguyen |
| 7,337,839 B2 | 3/2008 | Ayoub et al. |
| 7,424,911 B2 | 9/2008 | McCarthy et al. |
| 7,450,053 B2 | 11/2008 | Funk et al. |
| 7,472,751 B2 | 1/2009 | Brannon et al. |
| 7,494,711 B2 | 2/2009 | Kaufman et al. |
| 7,521,389 B2 | 4/2009 | Shmotev et al. |
| 7,527,097 B2 | 5/2009 | Patel |
| 7,528,096 B2 | 5/2009 | Brannon et al. |
| 7,541,318 B2 | 6/2009 | Weaver et al. |
| 7,568,524 B2 | 8/2009 | Blackburn et al. |
| 7,598,898 B1 | 10/2009 | Funk et al. |
| 7,612,021 B2 | 11/2009 | Chatterji et al. |
| 7,648,934 B2 | 1/2010 | Shmotev et al. |
| 7,669,657 B2 | 3/2010 | Symington et al. |
| 7,699,106 B2 | 4/2010 | Brannon et al. |
| 7,703,531 B2 | 4/2010 | Huang et al. |
| 7,721,803 B2 | 5/2010 | Huang et al. |
| 7,726,399 B2 | 6/2010 | Brannon et al. |
| 7,727,940 B2 | 6/2010 | Reddy et al. |
| 7,735,556 B2 | 6/2010 | Misselbrook et al. |
| 7,772,163 B1 | 8/2010 | Brannon et al. |
| 7,789,147 B2 | 9/2010 | Brannon et al. |
| 7,790,656 B2 | 9/2010 | Windebank et al. |
| 7,825,053 B2 | 11/2010 | Duenckel et al. |
| 7,833,947 B1 | 11/2010 | Kubala |
| 7,841,411 B2 | 11/2010 | Fuller et al. |
| 7,900,702 B2 | 3/2011 | Reddy et al. |
| 7,918,277 B2 | 4/2011 | Brannon et al. |
| 7,954,548 B2 | 6/2011 | Curimbaba et al. |
| 7,971,644 B2 | 7/2011 | Ladva et al. |
| 8,003,214 B2 | 8/2011 | Rediger et al. |
| 8,006,755 B2 | 8/2011 | Bicerano |
| 8,058,213 B2 | 11/2011 | Rediger et al. |
| 8,061,427 B2 | 11/2011 | Jackson et al. |
| 8,063,000 B2 | 11/2011 | Wilson |
| 8,082,994 B2 | 12/2011 | Nguyen et al. |
| 8,091,637 B2 | 1/2012 | Fripp |
| 8,104,537 B2 | 1/2012 | Kaminsky |
| 8,113,283 B2 | 2/2012 | Welton et al. |
| 8,127,844 B2 | 3/2012 | Luharuka et al. |
| 8,127,849 B2 | 3/2012 | Gupta |
| 8,127,850 B2 | 3/2012 | Brannon et al. |
| 8,167,043 B2 | 5/2012 | Willberg et al. |
| 8,178,477 B2 | 5/2012 | Skala et al. |
| 8,227,026 B2 | 7/2012 | McDaniel et al. |
| 8,236,737 B2 | 8/2012 | Fan et al. |
| 8,240,383 B2 | 8/2012 | Xu et al. |
| 8,281,857 B2 | 10/2012 | Willberg et al. |
| 8,291,978 B2 | 10/2012 | Hutchins et al. |
| 8,327,940 B2 | 12/2012 | Boronin et al. |
| 8,354,939 B2 | 1/2013 | McDaniel et al. |
| 8,360,149 B2 | 1/2013 | Hughes et al. |
| 8,361,373 B1 | 1/2013 | Byron |
| 8,420,578 B2 | 4/2013 | Usova et al. |
| 8,459,353 B2 | 6/2013 | Hughes et al. |
| 8,496,057 B2 | 7/2013 | Ferrero et al. |
| 8,540,024 B2 | 9/2013 | Kosarev et al. |
| 8,584,755 B2 | 11/2013 | Willberg et al. |
| 8,596,355 B2 | 12/2013 | Kaminsky et al. |
| 8,596,361 B2 | 12/2013 | Willberg et al. |
| 8,596,362 B2 | 12/2013 | Nelson |
| 8,603,578 B2 | 12/2013 | Smith et al. |
| 8,607,870 B2 | 12/2013 | Gu et al. |
| 8,613,314 B2 | 12/2013 | Garcia-Lopez de Victoria et al. |
| 8,614,157 B2 | 12/2013 | Pope et al. |
| 8,701,774 B2 | 4/2014 | Johnson, Sr. |
| 8,739,878 B2 | 6/2014 | Brannon et al. |
| 8,770,294 B2 | 7/2014 | Tanguay et al. |
| 8,772,207 B2 | 7/2014 | Geary et al. |
| 8,869,888 B2 | 10/2014 | Cramer et al. |
| 8,931,553 B2 | 1/2015 | Cannan et al. |
| 8,936,083 B2 | 1/2015 | Nguyen |
| 8,944,164 B2 | 2/2015 | Veldman et al. |
| 8,959,954 B2 | 2/2015 | Koseski et al. |
| 8,960,284 B2 | 2/2015 | Nguyen et al. |
| 8,978,764 B2 | 3/2015 | Dusseault et al. |
| 8,993,489 B2 | 3/2015 | McDaniel et al. |
| 9,010,424 B2 | 4/2015 | Agrawal et al. |
| 9,023,770 B2 | 5/2015 | Todd et al. |
| 9,080,441 B2 | 7/2015 | Meurer et al. |
| 9,091,161 B2 | 7/2015 | Brannon |
| 9,096,790 B2 | 8/2015 | McCrary et al. |
| 9,097,097 B2 | 8/2015 | DiFoggio et al. |
| 9,102,867 B2 | 8/2015 | Parse et al. |
| 9,109,992 B2 | 8/2015 | Wang |
| 9,140,118 B2 | 9/2015 | Kulkarni et al. |
| 9,145,513 B2 | 9/2015 | Pershikova et al. |
| 9,175,210 B2 | 11/2015 | Eldred et al. |
| 9,175,529 B2 | 11/2015 | Jamison et al. |
| 9,228,041 B2 | 1/2016 | Martinez-Castro et al. |
| 9,234,127 B2 | 1/2016 | De Paiva Cortes et al. |
| 9,234,415 B2 | 1/2016 | Hughes et al. |
| 9,243,491 B2 | 1/2016 | McDaniel et al. |
| 9,290,689 B2 | 3/2016 | Lafitte et al. |
| 9,291,045 B2 | 3/2016 | Wheeler et al. |
| 9,315,719 B2 | 4/2016 | Fang et al. |

(56) References Cited

U.S. PATENT DOCUMENTS

| | | | |
|---|---|---|---|
| 9,322,269 B2 | 4/2016 | Matherly et al. |
| 9,353,613 B2 | 5/2016 | Soliman et al. |
| 9,388,334 B2 | 7/2016 | Hughes et al. |
| 9,458,710 B2 | 10/2016 | Makarychev-Mikhailov et al. |
| 9,523,268 B2 | 12/2016 | Potapenko et al. |
| 9,556,376 B2 | 1/2017 | Huang et al. |
| 9,574,130 B2 | 2/2017 | Gupta |
| 9,611,423 B2 | 4/2017 | Zhang et al. |
| 9,631,137 B2 | 4/2017 | Fuss et al. |
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 | 3/2020 | Sen et al. |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,014,810 B1 | 5/2021 | De Wit et al. |
| 11,015,437 B2 | 5/2021 | Zhang et al. |
| 11,021,649 B2 | 6/2021 | Bai et al. |

(56) References Cited

U.S. PATENT DOCUMENTS

| | | |
|---|---|---|
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,465,155 B1 | 10/2022 | Mitchell et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1 | 2/2009 | Skala et al. |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0211346 A1 | 7/2015 | Potapenko et al. |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0312126 A1 | 10/2016 | Wormsbecker et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0100389 A1* | 4/2018 | Sen ........................ C09K 8/80 |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0112520 A1 | 4/2019 | Knoer et al. |
| 2019/0241789 A1 | 8/2019 | Agapiou et al. |
| 2019/0330520 A1 | 10/2019 | Cannan et al. |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1* | 10/2020 | Cho .......................... B01J 2/06 |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |

(56) References Cited

U.S. PATENT DOCUMENTS

| | | |
|---|---|---|
| 2021/0229049 A1 | 7/2021 | Mazrooee et al. |
| 2021/0246364 A1 | 8/2021 | Gordon et al. |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1 | 5/2023 | Decker |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |

FOREIGN PATENT DOCUMENTS

| | | |
|---|---|---|
| CN | 203319922 U | 12/2013 |
| CN | 109236262 A | 8/2020 |
| CN | 109751029 B | 10/2021 |
| PL | 234113 B1 | 3/2018 |
| PL | 234114 B1 | 11/2018 |
| WO | 2007141519 A2 | 12/2007 |
| WO | 2008033225 A2 | 3/2008 |
| WO | 2011163529 A1 | 12/2011 |
| WO | 2012040025 A2 | 3/2012 |
| WO | 2012051026 A2 | 4/2012 |
| WO | 2012104582 A1 | 8/2012 |
| WO | 2013059793 A2 | 4/2013 |
| WO | 2013119507 A1 | 8/2013 |
| WO | 2013158308 A1 | 10/2013 |
| WO | 2013176977 A1 | 11/2013 |
| WO | 2014039968 A1 | 3/2014 |
| WO | 2014172953 A1 | 10/2014 |
| WO | 2014172955 A1 | 10/2014 |
| WO | 2015021523 A1 | 2/2015 |
| WO | 2015031415 A2 | 3/2015 |
| WO | 2015041690 A1 | 3/2015 |
| WO | 2016033533 A1 | 3/2016 |
| WO | 2016054022 A1 | 4/2016 |
| WO | 2016074075 A1 | 5/2016 |
| WO | 2016168719 A1 | 10/2016 |
| WO | 2018001748 A1 | 1/2018 |
| WO | 2018094123 A1 | 5/2018 |
| WO | 2019164694 A1 | 8/2019 |
| WO | 2019199431 A1 | 10/2019 |
| WO | 2019/222034 A1 | 11/2019 |
| WO | 2020131122 A1 | 6/2020 |
| WO | 2020139472 A1 | 7/2020 |
| WO | 2020185373 A1 | 9/2020 |
| WO | 2021030287 A1 | 2/2021 |
| WO | 2021158397 A1 | 8/2021 |
| WO | 2021158398 A1 | 8/2021 |
| WO | 2022232715 A1 | 11/2022 |
| WO | 2022241338 A1 | 11/2022 |
| WO | 2022241339 A1 | 11/2022 |
| WO | 2023040535 A1 | 3/2023 |
| WO | 2024131192 A1 | 6/2024 |

OTHER PUBLICATIONS

A. Abrams, "Mud Design to Minimize Rock Impairment Due to Particle Invasion", J Pet Technol 29 (05): 586-592, May 1, 1977.

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the Scoop Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, col. 39 Issue 5, Jan. 24, 2023.

Guo et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

(56) References Cited

OTHER PUBLICATIONS

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)—Coke Composites Prepared by Mechanical Alloying Technique", XP055926292, DOI: 10.20944/preprints201608. 0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating to Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

Labus et al., "The Concept of Coke Based Proppants for Coal Bed Fracturing", IOP Conference Series: Earth and Environmental Science 261 Paper Open Access, 2019, IOP Publishing Ltd., 12 pages.

International Search Report and Written Opinion, dated Jun. 1, 2022 issued in related PCT Application No. PCT/US2022/070811, 10 pages.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

* cited by examiner

PROPPANT PARTICULATES FORMED FROM DELAYED COKE AND METHODS RELATED THERETO

CROSS-REFERENCE TO RELATED APPLICATIONS

This application claims priority to 63/382,968 filed 9 Nov. 2022. This application is also related to U.S. 2021/0253944 entitled "Proppant Particulates Formed from Flexicoke and Methods Related Thereto" filed on Jan. 27, 2021; WO 2021/158397 entitled "Proppant Particulates Formed from Flexicoke and Methods Related Thereto" filed on Jan. 27, 2027; U.S. 2021/0246364 entitled "Proppant Particulates Formed from Fluid Coke and Methods Related Thereto" filed on Jan. 27, 2021; WO 2021/158398 entitled "Proppant Particulates Formed from Fluid Coke and Methods Related Thereto" filed on Jan. 27, 2021; U.S. 63/186,987 filed on May 11, 2021; and PCT/US2022/070811 filed on Feb. 24, 2022.

FIELD OF THE INVENTION

The present disclosure relates to fracturing operations and proppant particulates employed therein.

BACKGROUND OF THE INVENTION

A wellbore may be drilled into a subterranean formation in order to promote removal (production) of a hydrocarbon or water resource therefrom. In many cases, the subterranean formation needs to be stimulated in some manner in order to promote removal of the resource. Stimulation operations may include any operation performed upon the matrix of a subterranean formation in order to improve fluid conductivity therethrough, including hydraulic fracturing, which is a common stimulation operation for unconventional reservoirs.

Hydraulic fracturing operations pump large quantities of fluid into a subterranean formation (e.g., a low-permeability formation) under high hydraulic pressure to promote the formation of one or more fractures within the matrix of the subterranean formation and create high-conductivity flow paths. Primary fractures extending from the wellbore and, in some instances, secondary fractures extending from the primary fractures, possibly dendritically, may be formed during a fracturing operation. These fractures may be vertical, horizontal, or a combination of directions forming a tortuous path.

Proppant particulates are often included in a fracturing fluid in order to keep the fractures open after the hydraulic pressure has been released following a hydraulic fracturing operation. Upon reaching the fractures, the proppant particulates settle therein to form a proppant pack to prevent the fractures from closing once the hydraulic pressure has been released.

There are oftentimes difficulties encountered during hydraulic fracturing operations, particularly associated with deposition of proppant particulates in fractures that have been created or extended under hydraulic pressure. Because proppant particulates are often denser materials (compared to the hydraulic fracturing fluid used), effective transport of the proppant particulates may be difficult due to settling, making it challenging to distribute the proppant particulates into more remote reaches of a network of fractures. In addition, fine-grained particles (referred to as "fines" that are less than 20 about µm, such as in the range of about 0.01 µm to about 20 µm, encompassing any value and subset therebetween), and capable of clogging port throats in proppant packs produced from crushing of proppant particulates within the fractures and through which fracturing fluid flows, resulting in arrested fluid conductivity, which may decrease production rates and/or necessitate wellbore cleanout operations.

Lower density particles like coke have been used in fracturing operations, for example, as described in U.S. Pat. No. 3,664,420, incorporated herein by reference in its entirety. In said patent, the coke is used as a far-field diverter and not a proppant. Far-field diverters pack into the tip or end of the primary and secondary fractures to form a very low-permeability zone. In the patent, after the far-field diverters are pumped into the fracture tips, proppant particles of higher density and larger size (e.g., metallic shot) are packed into the majority of the fractures to form high-permeability zones.

Fluid coke and flexicoke have previously been demonstrated as possessing mechanical properties that make them suitable for use as proppant during fracturing operations, including unconventional reservoirs. By contrast, delayed coke possesses weaker mechanical properties, and thus is viewed to be less efficacious in such fracturing operations, despite its widespread availability. The use of delayed coke as proppant is thus associated with a higher loss of measured fracture conductivity with increasing closure stress. There is a need for enhancing the mechanical properties of delayed coke for use as proppant particulates in subterranean fracturing operations.

SUMMARY

The present disclosure generally relates to fracturing and, more specifically, to proppant particulates for fracturing that are formed from delayed coke, and methods related thereto.

A nonlimiting example fracturing fluid of the present disclosure comprises: a carrier fluid; and thermally post-treated delayed coke proppant particulates, wherein the thermally post-treated delayed coke proppant particulates comprise delayed coke that has been thermally post-treated to a temperature in the range of about 400° C. to about 1000° C. for a predetermined duration and ground to a predetermined average size diameter in either order.

A nonlimiting example method of the present disclosure comprises: introducing a fracturing fluid into a subterranean formation, the fracturing fluid comprising a carrier fluid and thermally post-treated delayed coke proppant particulates, wherein the thermally post-treated delayed coke proppant particulates comprise delayed coke that has been thermally post-treated to a temperature in the range of about 400° C. to about 1000° C. for a predetermined duration and ground to a predetermined average size diameter in either order.

These and other features and attributes of the disclosed methods and compositions of the present disclosure and their advantageous applications and/or uses will be apparent from the detailed description which follows.

BRIEF DESCRIPTION OF DRAWINGS

The following drawings are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE INVENTION

Figures 1A, 1B, 1C:
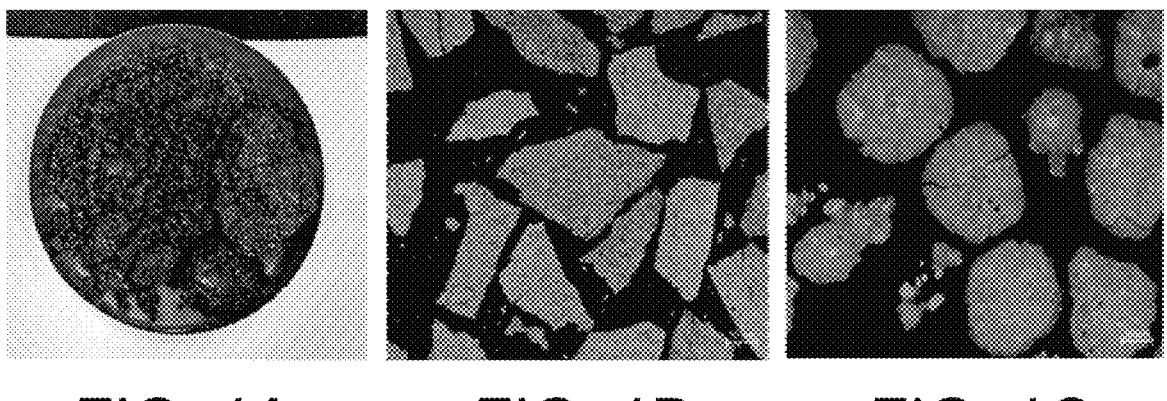
FIGS. 1A-1C shows images comparing the size and shape of typical delayed coke compared to fluid coke.

The present disclosure generally relates to fracturing and, more specifically, to proppant particulates for fracturing that are formed from delayed coke, and methods related thereto.

As discussed above, proppant particulates can be used effectively during fracturing operations, but there may be issues associated with their use. First, the high densities of typical proppant particulates may hinder their transport, possibly leading to inadequate proppant particulate disposition within one or a plurality of fractures. Second, some proppant particulates are prone to fines formation due to low crush strength values, which may lead to decreased fracture conductivity due to fines accumulation within the fracture.

The present disclosure alleviates the foregoing difficulties and provides related advantages as well. In particular, the present disclosure provides proppant particulates composed of delayed coke using a thermal processing route to enhance the mechanical properties of the delayed coke to be comparable to fluid cokes and flexicokes. The delayed coke proppant particulates are ground to mesh ranges of interest and exhibit low densities and high crush strengths, thereby addressing two significant shortcomings of traditional proppant particulates, generally formed from sand particles.

Typically, delayed coke is used as an inexpensive, low BTU fuel source in various manufacturing processes for heat. By using delayed coke as proppant particulates, one creates a useful application of the material with no associated $CO_2$ emissions. In effect, using delayed coke as proppant instead of as a fuel is a form of sequestering carbon that would otherwise contribute to $CO_2$ emissions.

Moreover, the costs associated with hydraulic fracturing may also be reduced at least because large volumes of delayed coke are readily available from already existent petroleum refinery process streams (~80% of all coke in total is delayed coke) and are typically cost-competitive compared to sand or other traditional proppant particulates; and their low density may decrease or eliminate the need to use gelled fracturing fluids (and the costs associated with gelation), thereby potentially reducing required pumping pressures, water consumption, and wellbore cleanout operations.

Additional advantages of the present disclosure that are not provided in current proppant particulate methodologies include, but are not limited to, moderate heat treatment short of full calcining, as commonly practiced, where heat treatments can reach 1200-1300° C., which has a profound impact on the mechanical strength of the material; careful removal of fines after grinding the delayed coke, which results in a proppant particulate product with vastly improved; and acceptable proppant particulate performance.

Illustrative aspects of the present disclosure include fracturing fluids comprising proppant particulates composed of delayed coke, derived from a thermal processing route to enhance their mechanical properties. The delayed coke proppant particulates are suitable for propping one or more fractures induced during a hydraulic fracturing operation within a horizontal, vertical, or tortuous wellbore, including hydrocarbon-bearing production wellbores and water-bearing production wellbores, and in unconventional formations (e.g., sandstone, shale, and the like).

DEFINITIONS AND TEST METHODS

As used herein, the term "proppant particulate" or simply "proppant," and grammatical variants thereof, refers to a solid material capable of maintaining open an induced fracture during and following a hydraulic fracturing treatment. The term "proppant pack" refers to a collection of proppant.

As used herein, the term "delayed coke," and grammatical variants thereof, refers to rejected carbon product left behind in a delayed coker, without regard to morphology (e.g., regardless of size, shape of the oriented domains within the particles and the particle shapes), including shot coke, sponge coke, transition coke, and needle coke. In one or more instances, the delayed coke may refer to a petroleum shot coke derived from a delayed coking process. The delayed coking process involves heating a residual oil feed to its thermal cracking temperature in two or more reactors ("coke drums"), which cracks heavy, long chain hydrocarbon molecules into a gasified product stream and a concentrated, solid carbon coke (called "delayed coke"). The process and resulting coke are called "delayed" because the residual oil feed is held by the reactors while cracking takes place. The delayed coke of the present disclosure is referred to as a "shot coke" because its appearance is characterized as semi-spherical agglomerates and because it is identified as an undesirable grade of petroleum coke due at least to its difficulty in handling and is generally unacceptable for specialty coke uses. In all instances of the present disclosure, the term "delayed coke" refers to shot coke.

Delayed coke may be characterized as having a sulfur content in the range of about 1 weight percent (wt. %) to about 8 wt. %, volatile matter in the range of about 8 wt. % to about 15 wt. %, a Hargrove grindability index in the range of about 30 to 130, and a density in the range of about 1.2 to about 1.4.

As used herein, the term "thermally post-treated delayed coke proppant particulates," and grammatical variants thereof, refers to a delayed coke that has at least been heat treated after the coking process, as described herein. The term further encompasses such heat treated delayed coke that has been ground and, optionally, had fines removed. That is, unless otherwise indicated, the term "thermally post-treated delayed coke proppant particulates" encompasses heat treated and ground (the term "ground," and grammatical variants thereof, encompasses "milled" in all instances, depending on the particular machinery utilized) delayed coke that may or may not have fines removed.

As used herein, the term "fluid coke," and grammatical variants thereof, refers to a material obtained through a carbon rejection process that is used for upgrading heavy hydrocarbon feeds and/or feeds that are challenging to process. The process produces a variety of lighter, more valuable liquid hydrocarbon products, as well as a substantial amount of fluid coke as byproduct. The fluid coke byproduct comprises high carbon content and various impurities. A distinguishing characteristic of fluid coke is that the carbon rejection process occurs in a fluidized bed (continuous) process, where the material is mixed and circulating at all times during the reaction process, which is a contract to delayed coke which forms a bed of rejected carbon in a batch process.

The term "flexicoke," and grammatical variants thereof, refers to a material produced from a modified variation of fluid coking, termed FLEXICOKING™ (trademark of ExxonMobil Research and Engineering Company ("ExxonMobil")). FLEXICOKING™ is based on fluidized bed technology developed by ExxonMobil, and is a carbon rejection process that is used for upgrading heavy hydrocarbon feeds. Unlike fluid coking, which utilizes a reactor and a burner, the FLEXICOKING™ process uses a reactor, a heater, and a gasifier.

As used herein, the term "apparent density," with reference to the density of proppant particulates, refers to the density of a proppant pack, which may be expressed in $g/cm^3$. The apparent density values of the present disclosure are determined based on helium (He) pycnometry.

As used herein, the term "bulk density," and grammatical variants thereof, with reference to the density of proppant particulates, refers to the density of a proppant pack, which may be expressed in $g/cm^3$. The bulk density values of the present disclosure are based on API RP-19C (2020) entitled "Measurement of Proppants Used in Hydraulic Fracturing and Gravel-packing Operations."

The term "carbon to hydrogen ratio" or "C/H ratio," and grammatical variants thereof, refers to an amount of elemental carbon to elemental hydrogen within a petroleum composition. The C/H Ratio is measured according to ASTM D5373-21 entitled "Test Methods for Determination of Carbon, Hydrogen and Nitrogen in Analysis Samples of Coal and Carbon in Analysis Samples of Coal and Coke."

As used herein, the term "thermal gravimetric analysis" or "TGA," and grammatical variants thereof, refers to the weight loss versus the temperature (° C.) of a sample, and represents % degradables.

As used herein, the term "nanoindentation," and grammatical variants thereof, refers to a method for measuring mechanical properties of a material. Nanoindentation measurements according to the present disclosure were performed using a nanoindenter equipped with a diamond Berkovich tip geometry that is driven onto proppant particulate surfaces over an 8×8 square grid of points separated by about 6 μm. Reduced elastic modulus ($E_r$) and the local hardness (H) are two mechanical properties determined from nanoindentation measurements, mathematically defined in equations 4.1 and 5. Reduced elastic modulus can be taken to approximate the material modulus with the limitation that the nanoindenter modulus is large compared to the investigated material. The local hardness is defined as the ratio of the maximum load and the indentation contact area.

As used herein, the term "fracture conductivity" refers to the degree to which fluid can flow in a proppant-filled fracture. It is a stress-dependent quantity, and is typically evaluated at various stress (pressure) levels. The fracture conductivity values of the present disclosure are based on the American Petroleum Institute's Recommended Practice 19D (API RP-19D) standard entitled "Measuring the Long-Term Conductivity of Proppants" (First Ed. May 2008, Reaffirmed May 2015).

As used herein, the term "crush strength," with reference to proppant particulates, refers to the stress load proppant particulates can withstand prior to crushing (e.g., breaking or cracking). The crush strength values of the present disclosure are based on API RP-19C.

All numerical values within the detailed description and the claims herein are modified by "about" or "approximately" with respect to the indicated value, and take into account experimental error and variations that would be expected by a person having ordinary skill in the art.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

Proppants, Methods, and Systems

Hydraulic fracturing operations require effective proppant particulates to maintain the permeability and conductivity of a production well, such as for effective hydrocarbon recovery. Effective proppant particulates are typically associated with a variety of particular characteristics or properties, including efficient proppant particulate transport within a carrier fluid, sufficient crush strength to maintain fractures propped upon the removal of hydraulic pressure, and efficient conductivity once the wellbore is brought on production.

The rate of settling of a proppant particulate within a fracturing fluid at least in part determines its transport capacity within one or more fractures created during a hydraulic fracturing operation. The rate of settling of a proppant particulate may be determined using Equation 1:

$$v = \frac{\rho_p - \rho_f}{18\eta} g\sigma^2, \qquad \text{Equation 1}$$

where v is the proppant particle; $\rho_p$–$\rho_f$ is proportional to the density difference between the proppant particle and the carrier fluid; $\eta$ is the viscosity of the carrier fluid; g is the gravitational constant; and $\sigma^2$ is proportional to the square of the proppant particulate size. As will be appreciated, proppant particulates having lower apparent densities and/or smaller average particle sizes settle at a slower rate within an identical carrier fluid (thus having better transport) compared to higher apparent density and/or larger average particle size proppant particulates.

Proppant particulate efficacy is further related to fracture conductivity, characterized by the fluid flow rate in a propped fracture under gradient pressure, the fracture being propped by a proppant pack. Fracture conductivity, $C_f$, is the product of the proppant pack permeability, k, and its thickness, h, and may be determined using Equations 2 and 3:

$$C_f = kh, \qquad \text{Equation 2}$$

$$k = \frac{1}{C}\frac{\phi^3}{(1-\phi)^2}\sigma_{eff}^2 \Phi_s^2, \qquad \text{Equation 3}$$

where C is a constant; $\phi$ is the proppant pack void fraction; $\sigma$ is the average particle size diameter of the proppant particulates; and $\Phi$ is a shape factor related to the asphericity of the proppant particulates. In tension with settling rate and transport, fracture conductivity favors proppant particulates having larger average particle size diameters, as well as thick proppant packs and narrow particle size distribution.

Fracture conductivity is related to the mechanical properties of proppant particulates. These properties can be characterized using nanoindentation analysis according to the Oliver-Pharr scheme to obtain local mechanical properties of proppant particulates. A nanoindenter makes measured indents using a calibrated diamond tip onto the surface of a material to establish a load-displacement curve. The load (P)-displacement (h) curve is established by contacting the tip of the nanoindenter onto the surface of a material to a maximum force, followed by retraction of the tip. The stiffness (S) is experimentally determined as the slope of the load-displacement curve during initial unloading, and the reduced elastic modulus is determined via the relationship according to Equation 4:

$$S = \frac{dP}{dh} = \frac{2}{\sqrt{\pi}}E_r\sqrt{A(h)}, \qquad \text{Equation 4}$$

Where A(h) is the projected area of the nanoindenter tip and for a given geometry is a known function of penetration depth. The reduced modulus $E_r$ is related to Young's modulus $E_S$ of the test sample according to equation 4.1:

$$\frac{1}{E_r} = \frac{1-v_i^2}{E_i} + \frac{1-v_s^2}{E_s} \qquad \text{Equation 4.1}$$

Where $E_s$ and $v_s$ are Young's modulus and Poisson's ratio of the proppant particulate sample, and $E_i$ and $v_i$ are Young's modulus and Poisson's ratio of the indenter tip. For a diamond indenter, $E_i$=1140 GPa and $v_i$=0.07 and the term $$\frac{1-v_i^2}{E_i}$$

is negligible for the samples of interest here.

The local hardness (H) of the material is determined according to Equation 5:

$$H = \frac{P_{max}}{A}, \qquad \text{Equation 5}$$

where $P_{max}$ is the maximum load and A is the contact area established by the nanoindenter tip under the maximum applied load.

As provided hereinabove, typical delayed coke has been shown to exhibit poor mechanical qualities compared to fluid coke and flexicoke, with consequent reduction in fracture conductivity. Comparing delayed coke to flexicoke, several stark differences are noted, among others as described herein.

First, the size and shape of delayed coke compared to both fluid coke and flexicoke differ significantly. Fluid and flexicoke particulates are more rounded and spherical in nature, owing to the environment in which they are formed, and a significant fraction of the size distribution of particles lies between 100 and 500 micrometers ($\mu$m), already in the range of interest for proppant particulates used in fracturing operations. By contrast, shot coke (a form of delayed coke), for example, forms as generally spherical agglomerates ranging from between 1 millimeter (mm) to 4.5 mm (e.g., about the diameter of a golf ball). Accordingly, a reduction in particle size is required to be useful as a proppant particulate (e.g., by ball, jet, or hammer milling or grinding). Such grinding (or milling) to a proppant particulate size range results in less rounded, angular particles, but also results in a significant amount of smaller fines that can interfere with fracture conductivity.

The size and shape differences described above are shown in FIGS. 1A-1C, providing images comparing shot coke (representing delayed coke) and fluid coke (also representative of flexicoke). FIG. 1A shows an image of shot coke as it exists upon completion of a coking process. As noted above, the generally spherical agglomerates are quite large in size (1 mm to 4.5 mm). FIGS. 1B and 1C show polarized light micrographs of ground shot coke and fluid coke, respectively. The ground shot coke has been mechanically sieved to obtain 100-mesh sized samples. The bulk density of the ground shot coke of FIG. 1B was measured at 0.62 grams per cubic centimeter (g/cm³) to 0.64 g/cm³, whereas the measured bulk density of the ground fluid coke of FIG. 1C was 0.76 g/cm³ to 0.86 g/cm³. This is a consequence of the more angular nature of the ground particles, which pack together less efficiently and result in a lower density than the more spherical particulates comprising fluid coke. Furthermore, as can be seen in FIG. 1B, it is challenging to remove very fine particulates from the ground material even with meticulous mechanical sieving. The retained particles can be shown to interfere substantially with fracture conductivity.

A second notable difference between delayed coke compared to both fluid coke and flexicoke is their volatile matter content. Volatile matter is composed of heavy hydrocarbons in the petroleum coke particle matrix and in the pores thereof, and represents an incomplete transformation of residual oil molecules into (relatively) hydrogen deficient, aromatic domains that structurally order into layered complexes. Delayed cokes typically have higher levels of volatile matter compared to both fluid cokes and flexicokes. Indeed, delayed cokes typically have a volatile matter content in the range of about 8 wt. % to about 15 wt. %, whereas fluid coke and flexicoke typically have a volatile matter content in the range of about 2 wt. % to about 6 wt. %, which may be due to the relative higher thermal severity of the coking process of fluid coke and flexicoke compared to delayed coking. The higher volatile matter content implies a lower degree of polymerization and graphitization, and may be at least partly responsible for the lower mechanical strength associated with delayed coke.

Figure 2:
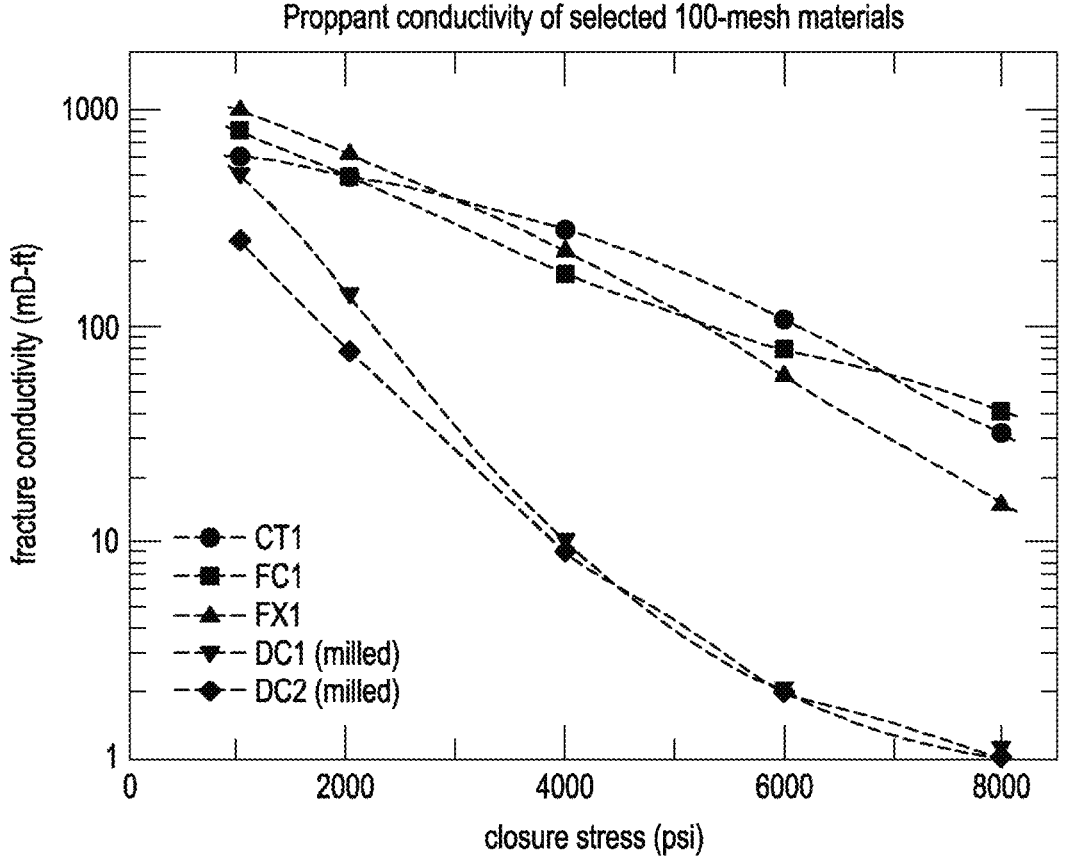
FIG. 2 shows a chart of the results of fracture conductivity testing of typical delayed coke compared to fluid coke, flexicoke, and sand proppant particulates.

Without being bound by theory, due to the aforementioned differences, and others not described herein, it is observed that typical delayed coke has lesser mechanical strength, and thus lesser fracture conductivity for use as proppant particulates, compared to the fluid coke and flexicoke, as well as traditional proppant particulates (e.g., sand). Such results can be observed in FIG. 2, illustrating the fracture conductivities, as measured by the recommended practices spelled out in API RP 19D, of 100-mesh shot coke compared to each of fluid coke, flexicoke, and traditional sand, as described in Example 1. Briefly, the fluid coke, flexicoke, and sand demonstrated similar fracture conductivities, whereas the shot coke exhibited significantly reduced fracture conductivities, particularly as closure stresses increased.

Accordingly, the present disclosure provides a method to enhance or upgrade the mechanical properties of delayed coke such that the low density, inexpensive, and readily available material can be effectively used as proppant particulates for hydraulic fracturing. In particular, the present disclosure provides a thermal post-treatment of delayed coke, which may beneficially be performed in addition to removal of fines generated during size grinding, to produce carbon rich enhanced delayed coke material suitable for use as proppant particulates. The resultant treated delayed coke possesses similar mechanical properties to fluid coke and flexicoke.

Figure 3:
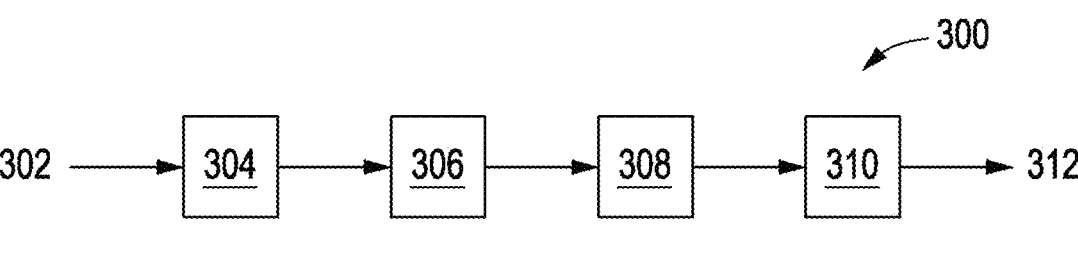
FIG. 3 is a simplified flowchart of the method and system of the present disclosure for treating delayed coke.

Referring now to FIG. 3, illustrated is a simplified flowchart of the system 300 of the present disclosure for treating delayed coke. Delayed coke 302 is received from a traditional delayed coker system. The received delayed coke 302 is generally in large agglomerate form. Thereafter, the delayed coke 302 is ground 304 using one or more grinding and/or milling devices to a size of interest. The grinding and/or milling devices are not considered to be particularly limiting and may include, but are not limited to, a grinding wheel, a ball mill, a jet mill, a hammer mill, or other suitable milling (grinding) devices. In one or more aspects, the delayed coke 302 may be ground 304 to a size having an average diameter in the range of about 100 μm to about 600 μm, encompassing any value and subset therebetween, such as about 100 μm to about 400 μm, or about 200 μm to about 400 μm, or about 100 μm to about 200 μm.

With continued reference to FIG. 3, after grinding 304, the ground delayed coke is heat treated 306 to a specified temperature and duration. The heat treatment may be performed in any heater or kiln suitable at achieving desired temperatures. In one or more aspects of the present disclosure, the heat treatment 306 is performed to achieve pyrolysis-like conditions, which may be performed in a kiln, such as a rotary calciner. The particular temperature and duration of the heat treatment 306 may depend on a number of factors including, but not limited to, the particular hydraulic fracturing operation and conditions related thereto for which the end-product, treated delayed coke proppant particulates are to be used. For example, in some aspects, the heat treatment 306 temperature may be in the range of about 400° C. to about 1000° C., encompassing any value and subset therebetween, such as about 400° C. to about 800° C., or about 600° C. to about 800° C. The duration of the heat treatment 306 may be in the range of about 15 minutes to about 24 hours, encompassing any value and subset therebetween, such as about 1 hour to about 15 hours, or about 1 hour to about 5 hours. The heat treatment may be in the presence of a gas, such as air, oxygen, steam, nitrogen, and the like, and any combination thereof.

After heat treatment 306, the ground and heat treated delayed coke may be processed to remove fines particles 308. Such fines removal process 308 may be performed by any suitable separation device and is not considered to be particularly limited. In one or more aspects, for example, the separation device may include, but is not limited to, an elutriator, a cyclone, hydrosizer, or other separation equipment. The fines removal process 308 is performed to minimize any particles that fall outside the desired range during grinding 304, such as a desired range between the average diameter sizes of about 100 μm to about 600 μm.

With continued reference to FIG. 3, after the fines removal process 308, the delayed coke material is sieved 310 using a sieving device to a particle size range of interest for proppant particulates used during hydraulic fracturing operations. The sieving device is not considered to be particularly limited and examples include, but are not limited to, a mechanical vibratory sieve, a manual sieve, and the like. The size of the sieving may be any suitable size for performance in a particular fracturing operation, such as, but not limited to, 30/50 mesh (300 μm to 600 μm), 40/70 (212 μm to 420 μm), 70/140 mes (106 μm to 212 μm), and the like.

Final, treated delayed coke proppant particulates 312 are thereafter obtained and possess suitable mechanical properties for use in hydraulic fracturing operations.

It is to be noted that FIG. 3 is not an exclusive process for performing the heat treatment enhancement of delayed coke as provided herein. For example, each of steps 304-312 may be performed in any order, without departing from the scope of the present disclosure. Moreover, certain steps in FIG. 3 may be repeated more than once (e.g., multiple milling devices may be used, multiple separating devices may be used, and the like) or, alternatively, one or more of the steps may be combined into a single step (e.g., the heating device may also serve as one or both of a separation device and/or sieving device). That is, the process illustrated in FIG. 3 is nonlimiting.

The thermally post-treated delayed coke proppant particulates of the present disclosure are formed using traditional delayed coking processes, as described herein, and further heat treated to a temperature in the range of about 400° C. to about 1000° C., or about 600° C. to about 800° C., encompassing any value and subset therebetween. The duration of the heat treatment may range from about 15 minutes to about 24 hours, or about 1 hour to about 12 hours, or about 1 hour to about 6 hours, or about 1 hour to about 4 hours, encompassing any value and subset therebetween to achieve improved mechanical response. The temperature and time is selected to achieve improved mechanical response.

After grinding, but before or after heat treatment, fines may be removed from the delayed coke for preparation of the thermally post-treated delayed coke proppant particulates described herein. In one or more instances, the fines are removed such that not more than about 10% (including 0%) of the particulates have a diameter below a desired size range, as described herein.

The thermally post-treated delayed coke proppant particulates may have a reduced elastic modulus in the range of about 5 gigapascals (GPa) to about 50 GPa, such as about 10 GPa to about 40 GPa, encompassing any value and subset therebetween.

The thermally post-treated delayed coke proppant particulates may have a local hardness value in the range of about 1 GPa to about 5 GPa, such as about 2 GPa to about 4 GPa, encompassing any value and subset therebetween.

The thermally post-treated delayed coke proppant particulates described herein may have a carbon content of about 80 wt. % to about 99.5 wt. %, or about 85 wt. % to about 96 wt. %, encompassing any value and subset therebetween.

The thermally post-treated delayed coke proppant particulates described herein may have a weight ratio of carbon to hydrogen of about 50:1 to about 120:1, or about 60:1 to about 98:1, encompassing any value and subset therebetween.

The thermally post-treated delayed coke proppant particulates described herein may have a percent degradables, as measured by TGA, in the range of about 0% to about 3%, encompassing any value and subset therebetween.

The thermally post-treated delayed coke proppant particulates described herein may have an impurities content (weight percent of all components other than carbon and hydrogen) of about 1 wt. % to about 15 wt. %, or about 3 wt. % to about 10 wt. %, encompassing any value and subset therebetween.

The thermally post-treated delayed coke proppant particulates described herein may have a sulfur content of 0 wt. % to about 6 wt. %, or about 0.2 wt. % to about 5 wt. %, encompassing any value and subset therebetween.

The thermally post-treated delayed coke proppant particulates described herein may have a nitrogen content of 0 wt. % to about 2 wt. %, or about 0.1 wt. % to about 1 wt. %, encompassing any value and subset therebetween.

The apparent density of the thermally post-treated delayed coke proppant particulates of the present disclosure may be in the range of about 1.4 grams per cubic centimeter ($g/cm^3$) to about 2.1 $g/cm^3$, or about 1.4 $g/cm^3$ to about 1.8 $g/cm^3$, encompassing any value and subset therebetween. Traditional sand proppant particulates generally have apparent densities greater than about 2.5 $g/cm^3$. Thus, the thermally post-treated delayed coke proppant particulates described herein have substantially lesser apparent densities compared to traditional sand proppant particulates, which is indicative of their comparably more effective transport and lower settling rates within a fracture formed as part of a hydraulic fracturing operation.

The bulk density of the thermally post-treated delayed coke proppant particulates may be less than about 0.7 $g/cm^3$, such as in the range of about 0.5 $g/cm^3$ to about 0.65 $g/cm^3$, encompassing any value and subset therebetween.

Typical proppant particulates are comprised of sand having particle diameters ranging from about 100 micrometers ($\mu m$) to about 1000 $\mu m$. The thermally post-treated delayed coke proppant particulates described herein are comparable to traditional proppant particulates in particle diameter size, having an average diameter of about 100 $\mu m$ to about 500 $\mu m$, or about 100 $\mu m$ to about 400 $\mu m$, or about 150 $\mu m$ to about 350 $\mu m$, encompassing any value and subset therebetween.

As shown below, the deformation of the thermally post-treated delayed coke proppant particulates of the present disclosure may be at least partially size dependent. In some aspects, the crush strength of the thermally post-treated delayed coke proppant particulates described herein may be in the range of about 3000 psi to about 12,000 psi, or about 3000 psi to about 6000 psi, or about 5000 psi to about 10,000 psi, or about 7500 psi to about 12,000 psi.

The long-term fracture conductivity of a proppant pack comprising the thermally post-treated delayed coke proppant particulates of the present disclosure is comparable to traditional sand proppant particulates, as well as fluid coke and flexicoke proppant particulates, particularly at comparable particle sizes, as described herein.

The thermally post-treated delayed coke proppant particulates described herein may be used as part of a fracturing fluid, comprising a flowable (e.g., liquid or gelled) carrier fluid and one or more optional additives. This fluid is usually formulated at the well site in a mixing process that is conducted while it is being pumped in the hydraulic fracturing process. When the fluid is formulated at the well site, thermally post-treated delayed coke proppant particulates can be added in a manner similar to the known methods for adding sand into the fracturing fluid. In some aspects, it may be preferred that delayed coke proppant particulates received from a coking process are first processed (e.g., at the manufacturing facility) to provide the thermal post-treatment and/or to remove any undesirably sized material (fines) prior to their use as proppant particulates. Optionally the thermal post-treatment and/or fines removal may be conducted at another facility, or be done in the field. Fines may be removed, for example, such as by use of bag filters or other separation methods, whether in storage, during transport, or in the field, in order to obtain a more uniform size distribution. In addition to the thermally post-treated delayed coke proppant particulates, it is within the scope of the present disclosure that the thermally post-treated delayed coke proppant particulates be included alone or in combination with one or more other types of proppant particulates (e.g., fluid coke or flexicoke, and even traditional proppant particulates). When thermally post-treated delayed coke proppant particulates are included in combination with another type of proppant particulate, the various proppant particulates can be mixed as a dry solid, mixed in a slurry, or added separately into a fracturing fluid that is being formulated at a facility or at the well site.

The carrier fluid of the present disclosure may be an aqueous-based fluid or a nonaqueous-based fluid. Aqueous-based fluids may include, for example, fresh water, saltwater (including seawater), treated water (e.g., treated production water), other forms of aqueous fluid, and any combination thereof. One aqueous based fluid class is often referred to as slickwater, and the corresponding fracturing operations are called slickwater fracturing. Nonaqueous-based fluids may include, for example, oil-based fluids (e.g., hydrocarbon, olefin, mineral oil), alcohol-based fluids (e.g., methanol), liquefied or supercritical $CO_2$ (carbon dioxide), and any combination thereof. In one or more aspects, the carrier fluid selected for the present disclosure are aqueous-based fluids.

In various aspects, the viscosity of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers. However, because of the low densities of the thermally post-treated delayed coke proppant particulates described herein, such viscosity-altering additives can typically be avoided, thus reducing costs and reducing potential damage to the wellbore.

In some instances, the carrier fluid used in hydraulic fracturing of horizontal wells is one or more of an aqueous-based fluid type, particularly in light of the large volumes of fluid typically required for hydraulic fracturing. The aqueous-based fluid may or may not be gelled, as described above. In some instances, the fracturing fluid may comprise an aqueous-based carrier fluid, which may or may not be foamed or gelled, and an acid (e.g., HCl) to further stimulate and enlarge pore areas of the matrix of fracture surfaces.

In addition, certain fracturing fluids suitable for use in the present disclosure may contain one or more additives such as, for example, dilute aids, biocides, breakers, corrosion inhibitors, crosslinkers, friction reducers (e.g., polyacrylamides), gels, salts (e.g., KCl), oxygen scavengers, pH control additives, scale inhibitors, surfactants, weighting agents, inert solids, fluid loss control agents, emulsifiers, emulsion thinners, emulsion thickeners, viscosifying agents, particulates, lost circulation materials, foaming agents, gases, buffers, stabilizers, chelating agents, mutual solvents, oxidizers, reducers, clay stabilizing agents, and any combination thereof.

The present disclosure includes methods of hydraulic fracturing using a fracturing fluid comprising thermally post-treated delayed coke proppant particulates, alone or in combination with other proppant particulates, during a hydraulic fracturing operation. That is, the thermally post-treated delayed coke proppant particulates may form the entirety of a proppant pack, or may form an integral part of a proppant pack. Other proppant particulate types that may be utilized with the thermally post-treated delayed coke proppant particulates described herein include, but are not limited to, the traditional sand proppant particulates described herein, as well as those made from bauxite, ceramic, glass, fluid coke, flexicoke, and any combination thereof, and may or may not have surface modifications. Proppant particulates composed of other materials are also within the scope of the present disclosure, provided that any such selected proppant particulates (including those composed of the aforementioned materials) are able to maintain their integrity upon removal of hydraulic pressure within an induced fracture, such that about 80%, preferably about 90%, and more preferably about 95% or greater of the particulate mass of the other proppant particulates retains integrity when subjected to 5000 psi of stress, a requirement also met by the thermally post-treated delayed coke proppant particulates of the present disclosure. That is, both the thermally post-treated delayed coke proppant particulates and any other proppant particulates used in the methods described herein must maintain mechanical integrity upon fracture closure, as any such types of particulates must intermingle or otherwise associate to form functional proppant packs for a successful hydraulic fracturing operation.

The methods described herein include preparation of fracturing fluid, which is not considered to be particularly limited, because the thermally post-treated delayed coke proppant particulates are capable of transportation in dry form or as part of a wet slurry from a manufacturing site (e.g., a refinery or synthetic fuel plant). Dry and wet forms may be transported via truck or rail, and wet forms may further be transported via pipelines. The transported dry or wet form of the thermally post-treated delayed coke proppant particulates may be added to a carrier fluid, including optional additives, at a production site, either directly into a wellbore or by pre-mixing in a hopper or other mixing equipment. In some aspects, for example, when the entirety of the proppant particulates within the fracturing fluid at a given time are thermally post-treated delayed coke proppant particulates, slugs of the dry or wet form may be added directly to the fracturing fluid (e.g., as it is introduced into the wellbore). These slugs of only thermally post-treated delayed coke proppant particulates may be followed by subsequent slugs of, again, only thermally post-treated delayed coke proppant particulates or of a thermally post-treated delayed coke proppant particulates and other proppant particulates. In other aspects, such as when other proppant particulate types are combined with the flexicoke proppant particulates, a portion or all of the fracturing fluid may be pre-mixed at the production site or each proppant type may be added directly to the fracturing fluid separately. Any other suitable mixing or adding of the thermally post-treated delayed coke proppant particulates to produce a desired fracturing fluid composition may also be used, without departing from the scope of the present disclosure.

The methods of hydraulic fracturing suitable for use in one or more aspects of the present disclosure involve pumping fracturing fluid comprising thermally post-treated delayed coke proppant particulates at a high pump rate into a subterranean formation to form at least a primary fracture, as well as potentially one or more secondary fractures extending from the primary fracture, one or more tertiary fractures extending from the secondary fractures, and the like (all collectively referred to as a "fracture"). In a preferred aspect, this process is conducted one stage at a time along a well. The stage is hydraulically isolated from any other stages which have been previously fractured. In one embodiment, the stage being fractured has clusters of perf holes (e.g., perforations in the wellbore and/or subterranean formation) allowing flow of hydraulic fracturing fluid through a metal tubular casing of the well into the formation. Such metal tubular casings are installed as part of the completions when the well is drilled and serve to provide mechanical integrity for the well. In some aspects, the pump rate for use during hydraulic fracturing may be at least about 20 barrels per minute (bbl/min), preferably about 30 bbl/min, and more preferably in excess of 50 bbl/min and less than 1000 bbl/min at one or more time durations during the fracturing operation (e.g., the rate may be constant, steadily increased or pulsed). These high rates may, in some aspects, be utilized after about 10% of the entire volume of fracturing fluid to be pumped into the formation has been injected. That is, at the early periods of a hydraulic fracturing operation, the pump rate may be lower and as fracture(s) begin to form, the pump rate may be increased. Generally, the average pump rate of the fracturing fluid throughout the operation may be about 10 bbl/min, preferably about 15 bbl/min, and more preferably in excess of 25 bbl/minute and less than 250 bbl/min. Typically, the pump rate during a fracturing operation for more than 30% of the time required to complete fracturing of a stage is in the range of about 20 bbl/min to about 150 bbl/min, or about 40 bbl/min to about 120 bbl/min, or about 40 bbl/min to about 100 bbl/min.

In various aspects, the methods of hydraulic fracturing described herein may be performed wherein the concentration of the proppant particulates (including thermally post-treated delayed coke proppant particulates and any other proppant particulates) within the injected fracturing fluid is altered (i.e., on-the-fly while the fracturing operation is being performed, such that hydraulic pressure is maintained within the formation and fracture(s)). For example, in some aspects, the initially injected fracturing fluid may be injected at a low pump rate and may comprise 0 volume % (vol. %) to about 1 vol. % proppant particulates. As one or more fractures begin to form and grow, the pump rate is increased and the concentration of proppant particulates may be increased in a stepwise fashion (with or without a stepwise increase in pump rate) with a maximum concentration of proppant particulates reaching about 2.5 vol. % to about 20 vol. %, encompassing any value and subset therebetween. For example, the maximum concentration of proppant particulates may reach at least 2.5 vol. %, preferably about 8 vol. %, and more preferably about 16 vol. %. In some aspects, all of the proppant particulates are thermally post-treated delayed coke proppant particulates. In other aspects, at one or more time periods during the hydraulic fracturing operation, at least about 2 vol. % to about 100 vol. % of any proppant particulates suspended within the fracturing fluid are thermally post-treated delayed coke proppant particulates, such as at least about 2 vol. %, preferably about 15 vol. %, more preferably about 25 vol. %, and even more preferably 100 vol. %.

It should be noted that some or all of the thermally post-treated delayed coke proppant particulates may be coated. Coatings are often used on sand particles used in hydraulic fracturing to either improve their flowability or to mitigate their flow back during production. Such types of coatings are within the scope of this invention. It is possible to introduce coated thermally post-treated delayed coke proppant particulates at any stage of the hydraulic fracturing process with the resulting composition being either a mixture of coated and uncoated thermally post-treated delayed coke proppant particulates, or entirely coated thermally post-treated delayed coke proppant particulates.

In one or more aspects, the thermally post-treated delayed coke proppant particulates may be introduced after about ⅛ to about ¾ of the total volume of fracturing fluid has been injected within a formation. Because of the low density of the thermally post-treated delayed coke proppant particulates, it may be beneficial to introduce the thermally post-treated delayed coke proppant particulates during later time periods of fracturing after which the fracture(s) have already grown substantially, such that the thermally post-treated delayed coke proppant particulates can travel within the fracturing fluid to remote locations of the formed fracture(s). Denser proppant particulates would not be able to reach these remote locations due to settling effects, for example.

The hydraulic fracturing methods described herein may be performed in drilled horizontal, vertical, or tortuous wellbores, hydrocarbon-producing (e.g., oil and/or gas) wellbores and water-producing wellbores. These wellbores may be in various subterranean formation types including, but not limited to, shale formations, sandstone formations, oil sands, gas sands, and the like.

The wellbores are typically completed using a metal (e.g., steel) tubular or casing that is cemented into the subterranean formation. To contact the formation, a plurality of perforations is created through the tubular and cement along a section to be treated, usually referred to as a plug and perforated ("plug and perf") cased-hole completion. Alternative completion techniques may be used without departing from the scope of the present disclosure, but in each technique, a finite length of the wellbore is exposed for hydraulic fracturing and injection of fracturing fluid. This finite section is referred to herein as a "stage." In plug and perf completions, the stage length may be based on a distance over which the tubular and cement have been perforated, and may be in the range of about 10 feet (ft) to about 2000 ft, for example, and more generally in the range of about 100 ft to about 300 ft, encompassing any value and subset therebetween. The stage is isolated (e.g., sliding sleeve, ball) such that pressurized fracturing fluid from the surface can flow through the perforations and into the formation to generate one or more fractures in only the stage area. Clusters of perforations may be used to facilitate initiation of multiple fractures. For example, clusters of perforations may be made in sections of the stage that are about 1 ft to about 3 ft in length, and spaced apart by about 2 ft to about 30 ft, encompassing any value and subset therebetween.

For each linear foot of the stage, at least about 6 barrels (about 24 cubic feet (ft³)), preferably about 24 barrels (about 135 ft³), and more preferably at least 60 barrels (about 335 ft³) and less than 6000 barrels (about 33,500 ft³) of fracturing fluid may be injected to grow the one or more fractures. In certain aspects, for each linear foot of the stage, at least about 1.6 ft³, preferably about 6.4 ft³, and more preferably at least 16 ft³ and less than 1600 ft³ of proppant particulates may be injected to prop the fractures. In some aspects, to prevent bridging of the proppant particulates during injection into the fractures, the ratio of the volume of the proppant particulates to the liquid portion of the fracturing fluid, primarily the carrier fluid, is greater than 0 and less than about 0.25 and preferably less than about 0.15. If the volume ratio becomes too large a phenomenon known as "sanding out" will occur.

Certain commercial operations, such as commercial shale fracturing operations, may be particularly suitable for hydraulic fracturing using the thermally post-treated delayed coke proppant particulates and methods described herein, as the mass of proppant particulates required per stage in such operations can be quite large and substantial economic benefit may be derived using the delayed coke proppant particulates. The cost of delayed coke as a source for the thermally post-treated delayed coke proppant particulates can be less than the cost of sand, and significantly less than lower density proppant particulates, which provide a significant economic benefit. Indeed, in some instances, a stage in a shale formation may be designed to require at least about 30,000, preferably about 100,000, and more preferably about 500,000 pounds (mass) of proppant particulates. In such cases, economic and performance benefit may be optimized when at least about 5%, preferably more than about 25%, and up to 100% of the proppant particulate mass comprises thermally post-treated delayed coke proppant particulates.

Multiple stages of the wellbore are isolated and hydraulic fracturing performed at each stage. The thermally post-treated delayed coke proppant particulates of the present disclosure may be used in any one, more, or all more stages, including at least 2 stages, preferably at least 10 stages, and more preferably at least 20 stages.

EXAMPLE EMBODIMENTS

Nonlimiting example embodiments of the present disclosure include:

Embodiment 1. A fracturing fluid comprising: a carrier fluid; and thermally post-treated delayed coke proppant particulates, wherein the thermally post-treated delayed coke proppant particulates comprise delayed coke that has been thermally post-treated to a temperature in the range of about 400° C. to about 1000° C. for a predetermined duration and ground to a predetermined average size diameter in either order.

Embodiment 2. The fracturing fluid of Embodiment 1, wherein the predetermined duration is in the range of about 15 minutes to about 24 hours.

Embodiment 3. The fracturing fluid of Embodiment 1 or 2, wherein the predetermined average particle size distribution is in the range of about 100 micrometers to about 600 micrometers.

Embodiment 4. The fracturing fluid of Embodiments 1-3, wherein the thermally post-treated delayed coke proppant particulates have apparent density in the range of about 1.4 g/cm³ to about 2.1 g/cm³.

Embodiment 5. The fracturing fluid of Embodiments 1-3, wherein the thermally post-treated delayed coke proppant particulates have a bulk density of less than about 0.7 g/cm³.

Embodiment 6. The fracturing fluid of any one of Embodiments 1-5, wherein the thermally post-treated delayed coke proppant particulates have a reduced elastic modulus in the range of about 5 gigapascals to about 50 gigapascals.

Embodiment 7. The fracturing fluid of any one of Embodiments 1-6, wherein the thermally post-treated delayed coke proppant particulates have a hardness value in the range of about 1 gigapascal to about 4 gigapascals.

Embodiment 8. The fracturing fluid of any one of Embodiments 1-7, wherein the thermally post-treated delayed coke proppant particulates have a weight ratio of carbon to hydrogen of about 50:1 to about 120:1.

Embodiment 9. The fracturing fluid of any one of Embodiments 1-8, wherein the thermally post-treated delayed coke proppant particulates have a percent of degradables as determined by thermogravimetric analysis in the range of about 0% to about 3%.

Any combination of Embodiments 1-4 and 6-9 are within the scope of the present disclosure, without limitation. Any combination of Embodiments 1-3 and 5-9 are within the scope of the present disclosure, without limitation.

Embodiment 10. A method comprising: introducing a fracturing fluid into a subterranean formation, the fracturing fluid comprising a carrier fluid and thermally post-treated delayed coke proppant particulates, wherein the thermally post-treated delayed coke proppant particulates comprise delayed coke that has been thermally post-treated to a temperature in the range of about 400° C. to about 1000° C. for a predetermined duration and ground to a predetermined average size diameter in either order.

Embodiment 11. The method of Embodiment 10, further comprising prior to introducing the fracturing fluid into the subterranean formation, removing at least a portion of fines having an average particle size distribution of less than about 20 micrometers.

Embodiment 12. The method of Embodiments 10-11, further comprising depositing at least a portion of the thermally post-treated delayed coke proppant particulates within one or more fractures in the subterranean formation to form a proppant pack.

Embodiment 13. The method of Embodiments 10-12, wherein the predetermined duration is in the range of about 15 minutes to about 24 hours.

Embodiment 14. The method of Embodiments 10-13, wherein the predetermined average particle size distribution in the range of about 100 micrometers to about 600 micrometers.

Embodiment 15. The method of Embodiments 10-14, wherein the thermally post-treated delayed coke proppant particulates have apparent density in the range of about 1.4 $g/cm^3$ to about 2.1 $g/cm^3$.

Embodiment 16. The method of Embodiments 10-14, wherein the thermally post-treated delayed coke proppant particulates have a bulk density of less than about 0.7 $g/cm^3$.

Embodiment 17. The method of any one of Embodiments 10-16, wherein the thermally post-treated delayed coke proppant particulates have a reduced elastic modulus in the range of about 5 gigapascals to about 50 gigapascals.

Embodiment 18. The method of any one of Embodiments 10-17, wherein the thermally post-treated delayed coke proppant particulates have a hardness value in the range of about 1 gigapascal to about 4 gigapascals.

Embodiment 19. The method of any one of Embodiments 10-18, wherein the thermally post-treated delayed coke proppant particulates have a weight ratio of carbon to hydrogen of about 50:1 to about 120:1.

Embodiment 20. The method of any one of Embodiments 10-19, wherein the thermally post-treated delayed coke proppant particulates have a percent of degradables as determined by thermogravimetric analysis in the range of about 0% to about 3%.

Any combination of Embodiments 10-15 and 17-20 are within the scope of the present disclosure, without limitation. Any combination of Embodiments 1-14 and 16-20 are within the scope of the present disclosure, without limitation.

To facilitate a better understanding of the aspects of the present disclosure, the following examples of preferred or representative aspects are given. In no way should the following examples be read to limit, or to define, the scope of the disclosure.

EXAMPLES

In the following examples, various experiments were performed and measurements taken to evaluate and validate the thermal post-treatment methodology of delayed coke described herein, such that the treated delayed coke exhibits mechanical properties suitable for use as proppant particulates during hydraulic fracturing operations.

Example 1: Fracture Conductivity Comparison

In this Example, the fracture conductivities of 100-mesh samples of a sand control (CT1), a fluid coke (FC1), a flexicoke (FX1), and two shot coke (representing delayed coke) samples were gathered from separate sources (DC1 and DC2). Each of DC1 and DC2 were ground to obtain the 100-mesh samples.

Fracture conductivity was determined using proppant packs sandwiched between Ohio sandstone cores with a proppant particulate loading of 2 pounds per square foot ($lb/ft^2$) of fracture surface. The system was allowed to relax under 1000 pounds per square inch (psi) of confining stress at 150° F. (65.6° C.) and the proppant pack permeability was measured by cross flowing a 2% aqueous KCl solution under a small pressure gradient. The permeability was multiplied by the pack height and reported as the fracture conductivity, as measured in millidarcy feet (mD-ft).

During the testing, the applied stress (closure stress) was incremented in 2000 psi intervals from 2000 psi to 8000 psi, and the system was allowed to relax for 50 hours before determining the conductivity at the stress level of interest. FIG. 2 illustrates a chart representing the results of the fracture conductivities. As shown, the fluid coke (FC1) and flexicoke (FX1) samples had conductivity characteristics similar to that of control sand (CT1) typically used in hydraulic fracturing operations; however, both shot coke samples (DC1 and DC2) exhibited inferior characteristics, particularly at higher closure stresses. Note that the asterisk represents the minimum recommended fracture conductivity at 6000 psi closure stress.

Figure 4:
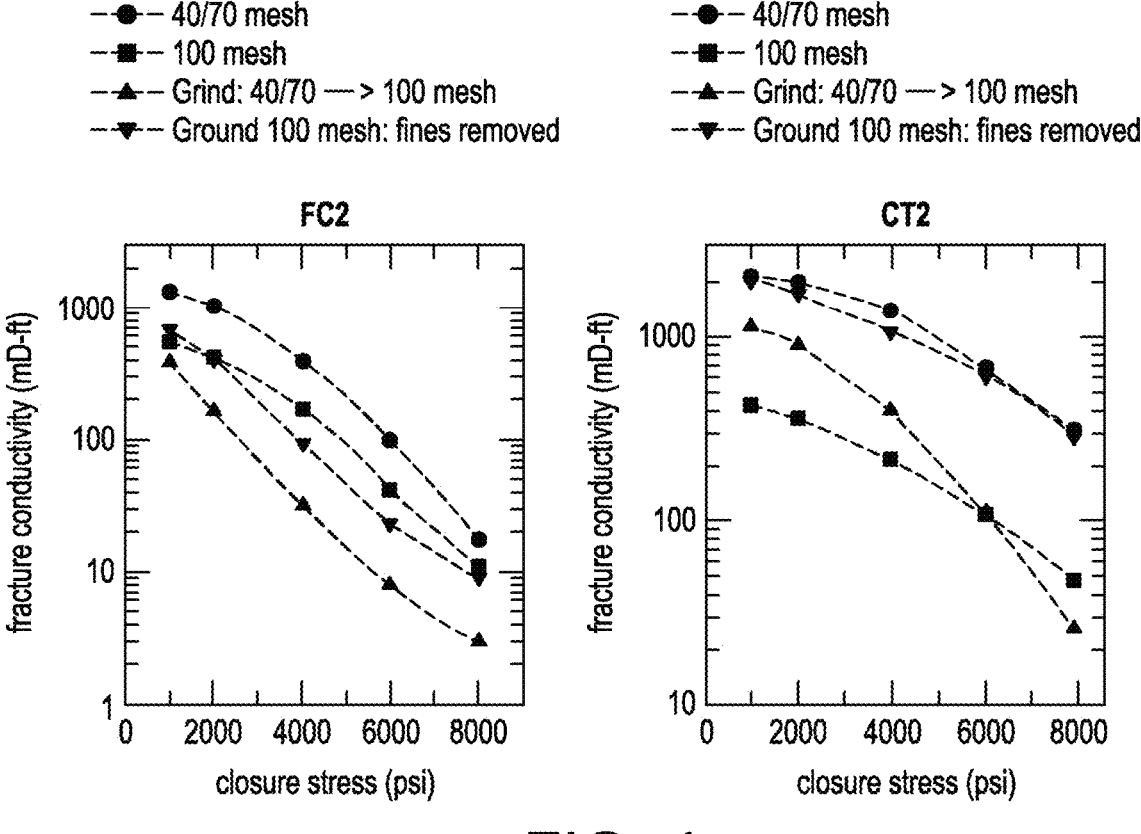
FIG. 4 shows comparative fracture conductivity results for fluid coke and traditional sand.

Example 2: Influence on Grinding (Milling) and Fines on Fracture Conductivity In this Example, the relative importance of grinding, particle shape, and fines characteristics of proppant particulates on fracture conductivity was evaluated. In this Example, a fluid coke sample (FC2) and a traditional sand sample (CT2) were compared. Each sample was tested at (1) 40/70 mesh (without grinding), (2) 100 mesh (without grinding), (3) 100 mesh (after grinding the 40/70 mesh sample with a high speed rotary mill and isolating the portion of the sample between 70/100 mesh, and (4) after removal of fines through elutriation of the ground 100 mesh sample (from (3)). The results are shown in FIG. 4.

As shown, the neat 40/70 mesh (without grinding) samples exhibit higher conductivity than the corresponding neat 100 mesh (without grinding) samples. The 100 mesh (after grinding but without sieving) samples show lower conductivity and a higher level of stress-dependence—and conductivity loss—compared to the neat 100 mesh (without grinding) samples. However, upon fines removal from the ground 100 mesh samples, the FC2 sample showed fracture conductivity similar to the neat 100 mesh (without grinding) sample, and the CT2 sample showed fracture conductivity similar to the neat 40/70 mesh (without grinding) sample. Accordingly, the removal of fines from the ground samples shows improvement in fracture conductivity.

Example 3: Influence on Size and Shape on Fracture Conductivity

In this Example, the proppant particulate size and shape distribution of FC2 (fluid coke) and CT2 (traditional sand) of Example 2 were characterized using automated digital imaging microscopy to measure the cumulative distribution function statistics for circular equivalent diameter. Particularly, each of FC2 and CT2 were evaluated using the samples: (2) 100 mesh (without grinding), (3) 100 mesh (after grinding the 40/70 mesh sample with a high speed rotary mill and isolating the portion of the sample between 70/100 mesh, and (4) after removal of fines through elutriation of the ground 100 mesh sample (from (3)) of Example 2; that is, the 40/70 mesh (without grinding) sample (1) of Example 2 was not evaluated in this Example.

Figure 5:
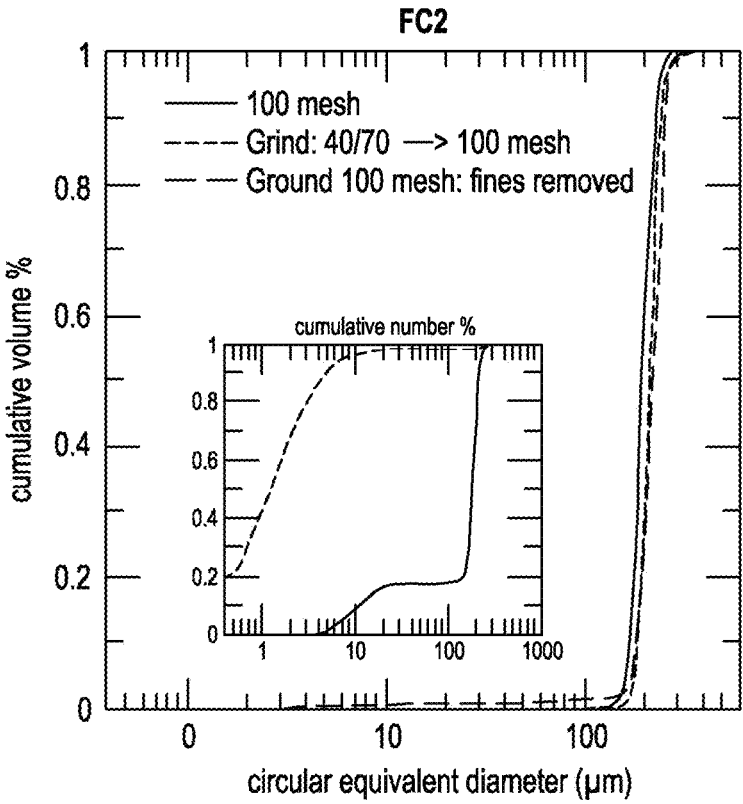
FIG. 5 shows comparative size distribution results for fluid coke and traditional sand.
Figure 5:
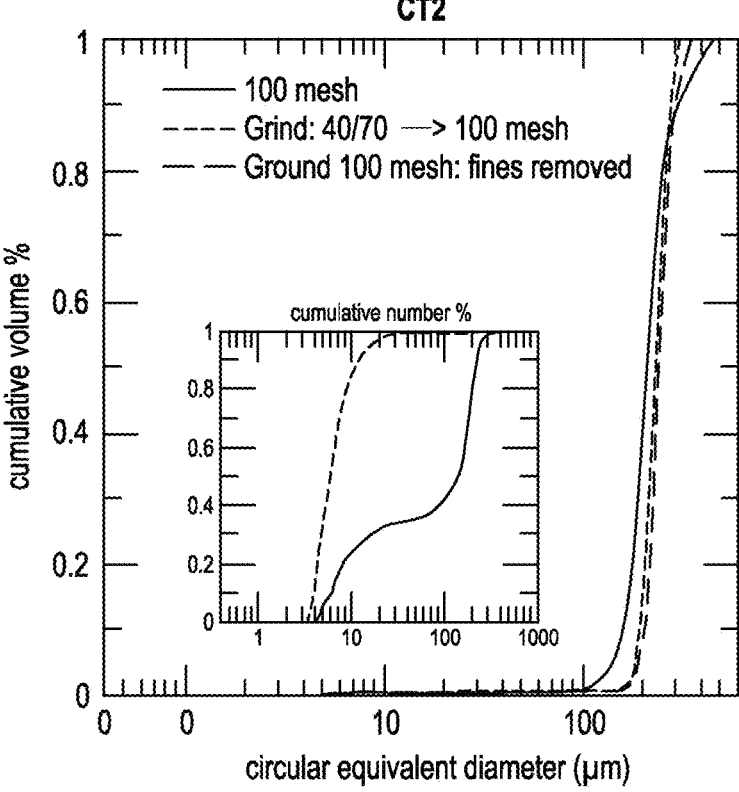

The results of proppant particulate size distribution are shown in FIG. 5, providing volumetric weighted statistics in the large chart and corresponding particle number weighted distributions in the inset. As shown, very little difference is observed in the overall distribution among each of the 100 mesh samples for both FC2 and CT2; however, when the distributions are examined on particle number basis, as shown in the inset of FIG. 5, it can be seen that a large number fraction of the sample is comprised of very small particles of <20 microns in equivalent diameter. Moreover, as shown, while the vast majority of the mass of each of the FC2 and CT2 samples reside in the 100 mesh range, upon comparison of the neat 100 mesh (without grinding) samples with the 100 mesh (after grinding but without sieving), it is evident that the ground samples have significantly greater fines content, and thus a negative impact upon overall fracture conductivities.

Figure 6:
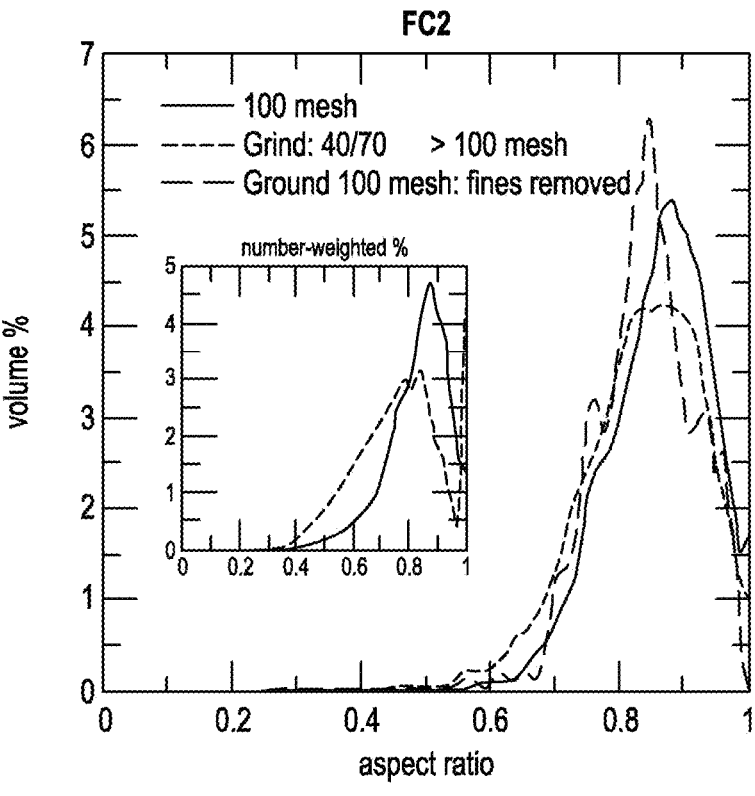
FIG. 6 shows comparative shape distribution results for fluid coke and traditional sand.
Figure 6:
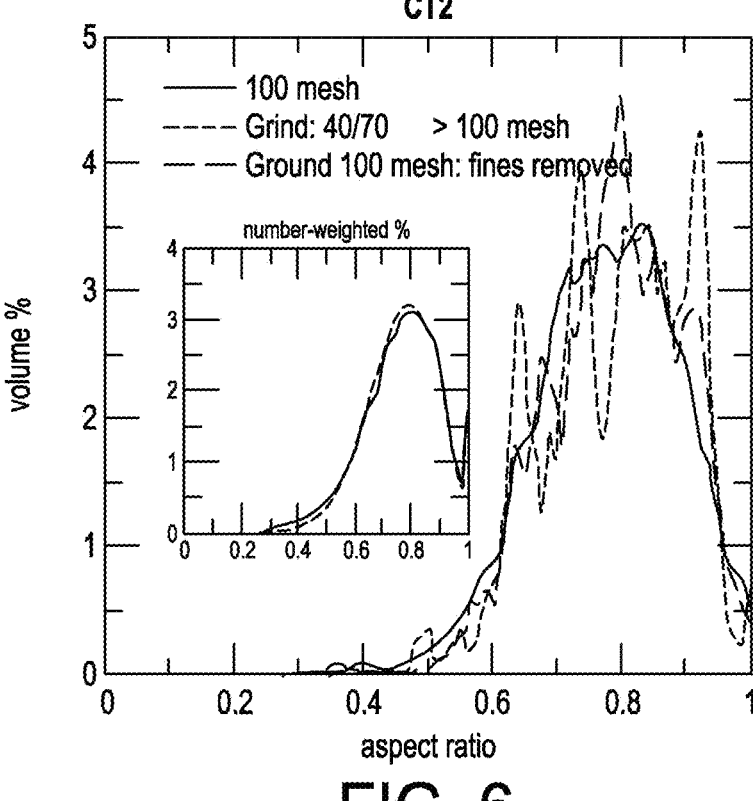

The results of the proppant particulate shape distribution are shown in FIG. 6 providing volumetric weighted statistics in the large chart and corresponding particle number weighted distributions in the inset. As shown, on a volumetric basis, the shape of the proppant particulates, if any, would have a minimal influence on fracture conductivity, as the aspect ratios are relatively similar across all 100 mesh samples for both FT2 and CT2. However, as with the size distribution discussed above, upon comparison of the neat 100 mesh (without grinding) samples with the 100 mesh (after grinding but without sieving) samples, it is evident that the ground samples have a larger number of proppant particulates having a smaller aspect ratio (inset of FIG. 6) due to the presence of fines. Accordingly, it is inferred that fines removal after grinding has a larger impact upon fracture conductivity than the shape of the proppant particulates themselves (see also FIG. 4).

Example 4: Effect of Thermal Post-Treatment

In this Example, the effect of the thermal post-treatment methods of the present disclosure were evaluated based on several criteria. Two shot coke (representing delayed coke) samples derived from the same sources as Example 1, DC1 and DC2, were evaluated and compared to the fluid coke sample of Example 1, FC2, and/or the traditional sand of Examples 2 and 3, CT2. The properties of each sample type were evaluated as a function of severity of the thermal post-treatment processing described herein. Each sample was heated in a tube furnace to a target temperature, as described below, held for 1 hour, and allowed to fully cool before removal. The samples were immersed in a $N_2$ gas flow to achieve pyrolysis conditions during the heat treatment. Thereafter, the samples were evaluated.

C/H Ratio and TGA

In this Example, heat-treated samples of DC2 were analyzed for compositional indicators expected to evolve as a function of heat treatment. The C/H ratio of the heat-treated samples were measured by Inductively Coupled Plasma Atomic Emission Spectroscopy (ICP-AES), and the volatile matter content was characterized by Thermogravimetric Analysis (TGA). In the TGA method applied here, a small quantity of sample is immersed in flowing $N_2$, and subjected to a defined temperature ramp from room temperature to 800° C., whereby volatile components of the sample are liberated by a variety of mechanisms. The volatile matter, or % degradables as shown in FIG. 7B, is defined as the mass loss of the sample between 110° C. to 1000° C. The results are shown in FIGS. 7A and 7B, respectively, wherein the results for samples heat treated at hold-temperatures between 600° C. and 1000° C. are shown compared to the baseline value of the fluid coke, and where the dotted lines demonstrate the C/H ratio or TGA of unground DC2 and FC2 without heat treatment (as-received) and thus do not correlate to the temperature increase.

Figure 7A:
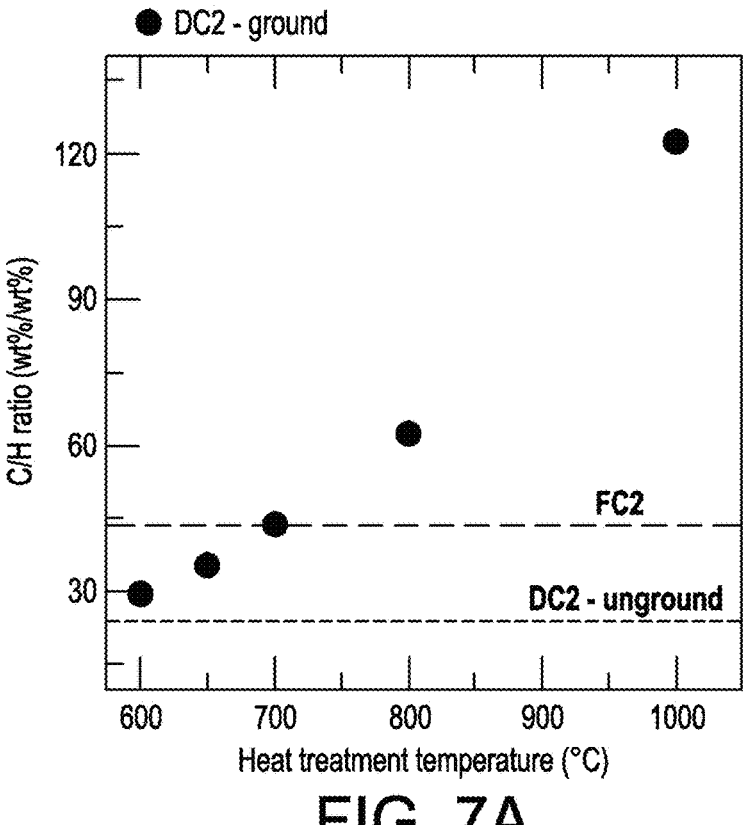
FIGS. 7A and 7B show the effect of C/H ratio and TGA on delayed coke with thermal post-treatment, according to one or more aspects of the present disclosure.
Figure 7B:
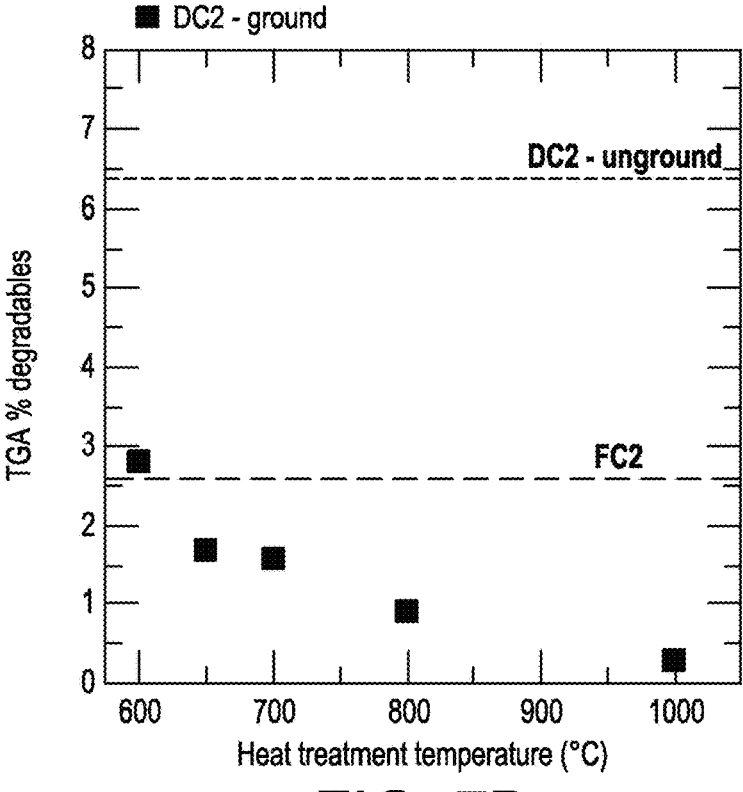

As shown, in FIG. 7A, the C/H ratio of the ground DC2 increases steadily with heat treatment as volatiles are liberated from the material, with comparable levels to FC2 achieved around 700° C. FIG. 7B shows a continuous decrease in volatile matter content remaining in the samples after heat treatment, with ground DC2 dropping below the FC2 levels at heat treatments between about 600° C. and 650° C. It is also worth noting that the ground DC2 weight loss during thermal treatment was fairly small, ranging from about 3.3 wt. % at 600° C. to about 8.9 wt. % at 800° C.

Accordingly, with increasing temperature, delayed coke can achieve equivalent or better C/H ratio and TGA % degradables compared to fluid coke (and flexicoke).

Apparent Density

Figure 8:
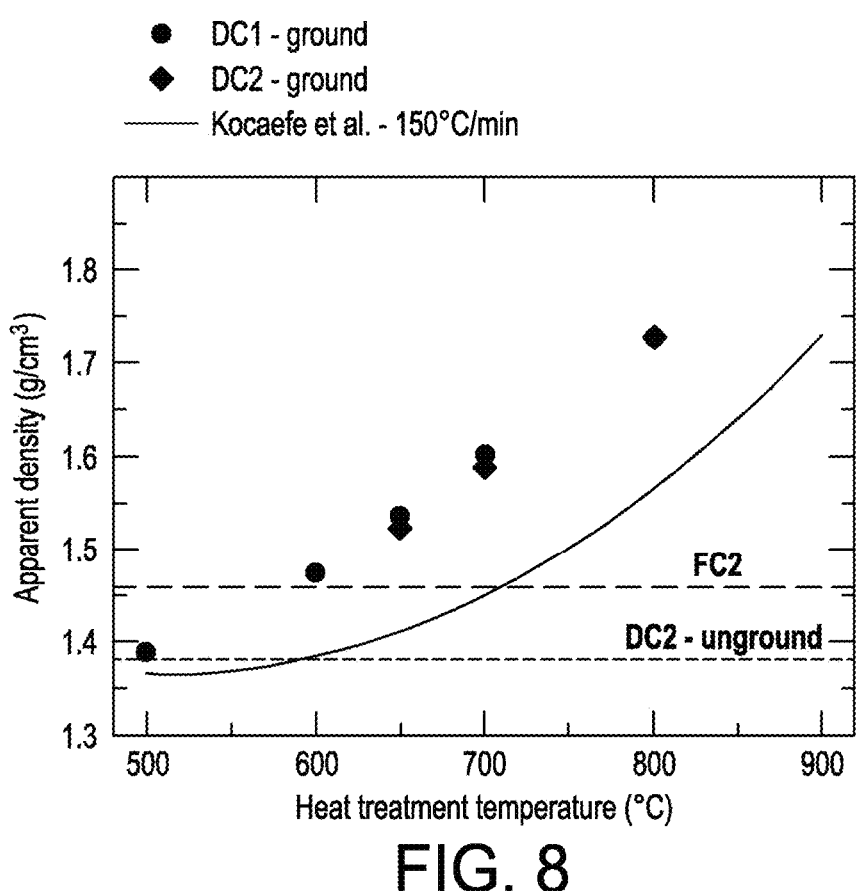
FIG. 8 shows the apparent densities of delayed coke with thermal post-treatment, according to one or more aspects of the present disclosure.

In this Example, we demonstrate that only a modest apparent density increase is associated with the heat-treatment of the previous Example. The apparent density of 40/70 mesh ground DC1 and ground DC2 samples were evaluated using He pycnometry after heat-treatment at hold temperatures between 50° and 800° C. and compared to as-received DC2 and FC2. The results are shown in FIG. 8, wherein the results between 600° C. and 800° C. are shown based on the baseline value of the fluid coke, and where the horizontal dotted lines demonstrate the apparent densities of as-received DC2 and FC2 without heat treatment and thus do not correlate to the temperature increase. As a further comparison, the sloped dotted line shows the apparent density of a commercial 3.2 wt. % S petroleum coke heated to a target temperature at 150° C./min, as reported in D. Kocaefe, A. Charette, and L. Castonguay, Green coke pyrolysis: investigation of simultaneous changes in gas and solid phases, Fuel, 74(6):791-799, 1995.

The apparent density of ground DC1 and DC2 begin to increase above 500° C., increasing by about 15% at 700° C.

Comparing ground DC1 and ground DC2, the heat-treated shot cokes show unappreciable differences in the behavior despite being derived from two separate sources. Compared to FC2, the apparent densities of the ground DC1 and ground DC2 samples cross over at approximately 600° C. Moreover, the thermal post-treatment process of the present disclosure compared to the commercial 3.2 wt. % S petroleum coke data illustrates the influence of heating rate and overall thermal severity of the heat-treatment process. Typical calcination of green petroleum cokes for use in anode manufacture will reach 1300° C. and achieve apparent densities of approximately 2.1 g/cm$^3$ and loss of 15 to 25 wt. % of material on a dry basis. Because it is desirable to have low density proppant particulates, it is apparent that heat-treatment in the range of 700° C. incurs only modest density increase and loss of material.

Nanoindentation

In this Example, the mechanical properties of thermal post-treatment shot coke (representing delayed coke) samples of DC2, ground to 100-mesh and heat treated between 600° C. and 1000° C. (at 1 hour or 4 hour durations) are compared to a traditional sand, CT3, the fluid coke sample of Example 1, FC1, and an epoxy to which the samples were mounted, as described below.

Figure 9A:
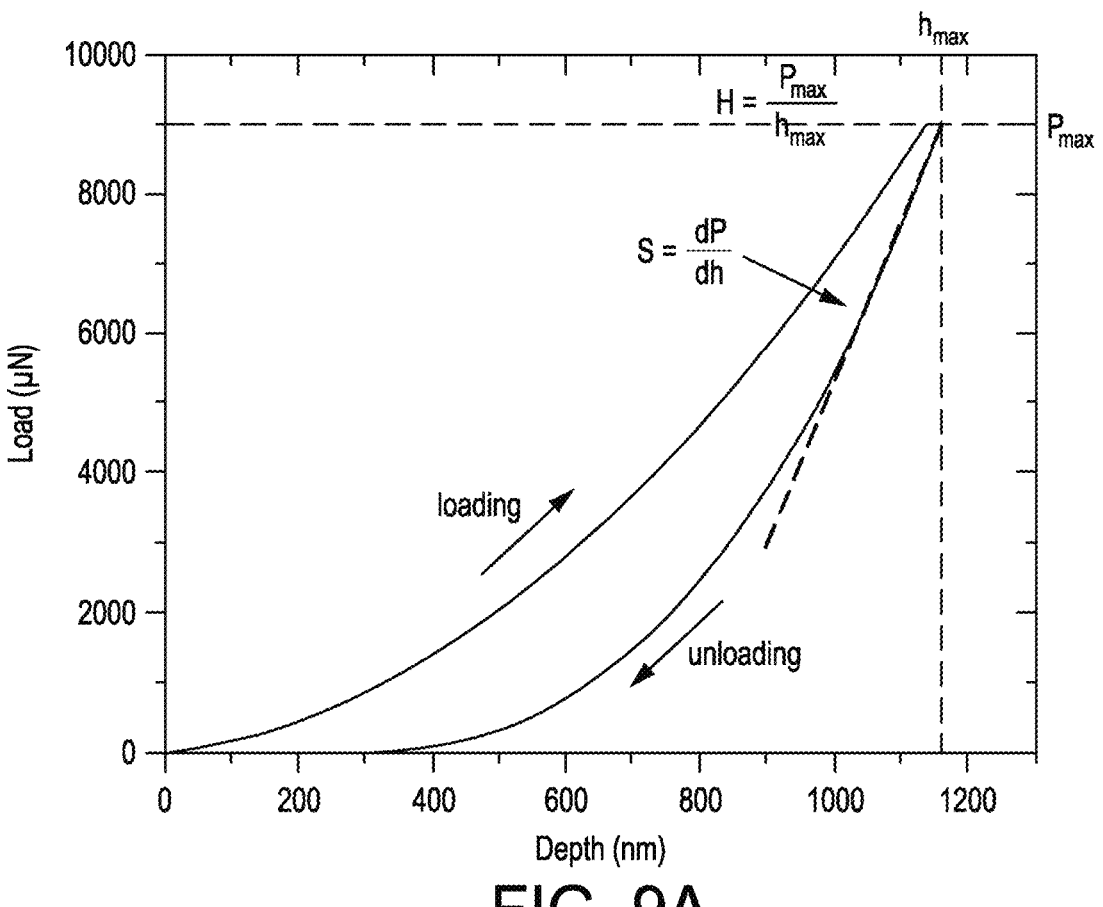
FIG. 9A shows nanoindentation methodology and FIG. 9B illustrates a residual indentation formed on a delayed coke sample according to one or more aspects of the present disclosure.
Figure 9B:
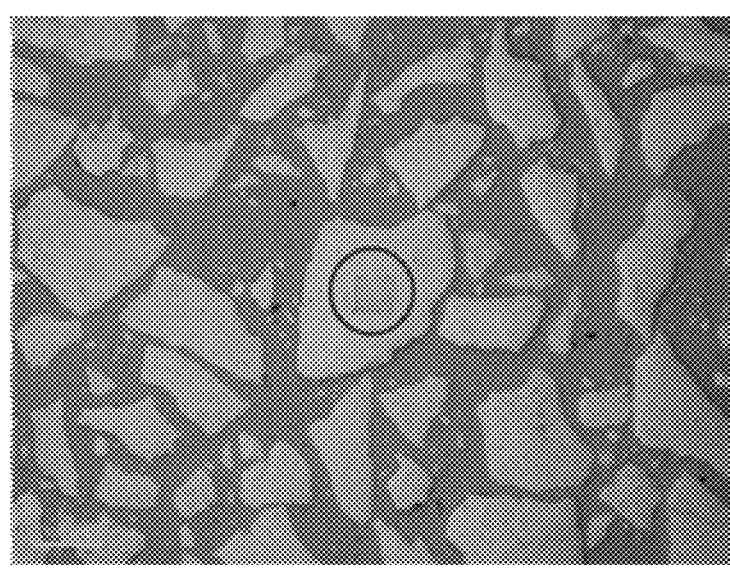

Samples were cast in epoxy in the form of 1-inch diameter billets, and polished smooth to expose flat grain surfaces (cross-section surfaces) for indentation. Nanoindentation was performed using a nanoindenter equipped with a diamond Berkovich tip as described above, and as illustrated in FIG. 9A. At each temperature, ten (10) different proppant particulates were sampled to collect statistics on average modulus and hardness properties, as well as their standard deviations. FIG. 9B shows a residual indentation formed on a DC2 shot coke sample according to the present Example.

Figure 10A:
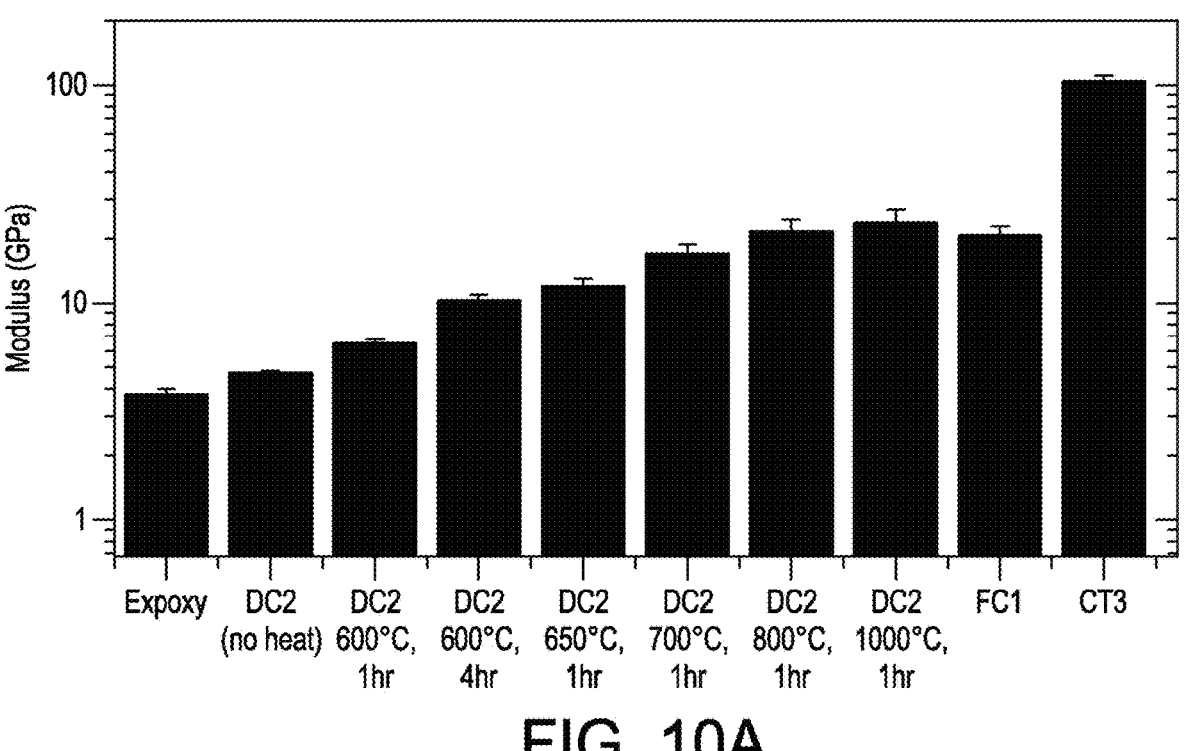
FIGS. 10A and 10B show charts of nanoindentation results of delayed coke samples, fluid coke samples, epoxy reference sample, and traditional sand sample, according to one or more aspects of the present disclosure.
Figure 10B:
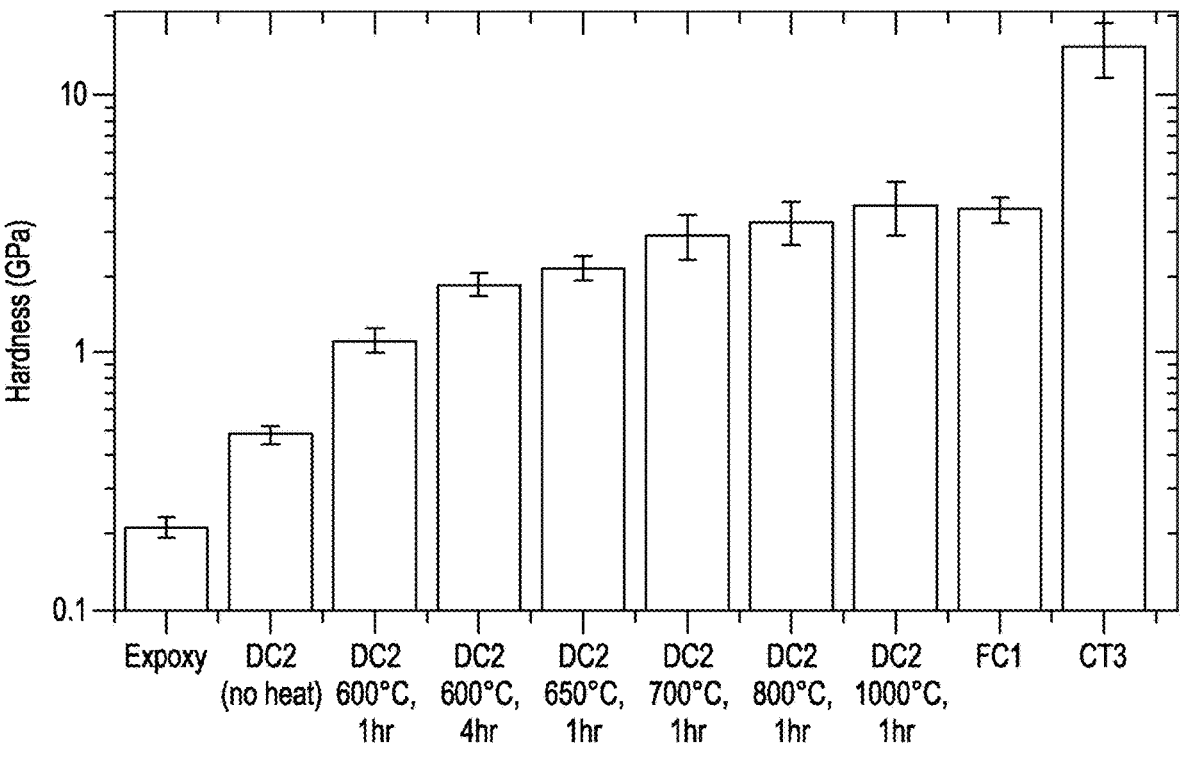

The nanoindentation results are shown in FIGS. 10A and 10B, where FIG. 10A shows the reduced elastic modulus results and FIG. 10B shows the hardness results.

As shown in FIG. 10A, the DC2 sample that has not been thermally post-treated (as-received) is similar to that of epoxy alone, having a modulus of 3-4 gigapascals (Gpa). As temperature increases, or duration of the same temperature increases, the modulus increases to values similar to FC1 fluid coke, achieving parity between about 700° C. and 800° C. Heat treatment to higher temperatures does not appear to significantly increase modulus. While the thermally post-treatment heated DC2 samples have a lesser modulus compared to CT3 traditional sand, it does exhibit comparable modulus to FC1 which is a demonstrated material for proppant particulate use during fracturing operations.

Referring now to FIG. 10B, the DC2 sample that has not been thermally post-treated (as-received) exhibits roughly twice the hardness compared to that of epoxy alone, having a hardness of about 0.2 Gpa. Similar to modulus, as heat-treatment temperature increases, or duration of the same temperature increases, the hardness of the DC2 heat treated samples increase to values similar to FC1 fluid coke, achieving parity between about 700° C. and 800° C. Heat treatment to higher temperatures does not appear to significantly increase hardness, although a slight increase was observed. While the heat-treated DC2 samples have a lesser hardness compared to CT3 traditional sand, it does exhibit comparable hardness to FC1 which is a demonstrated material for proppant particulate use during fracturing operations.

Uniaxial Compression

Figure 11:
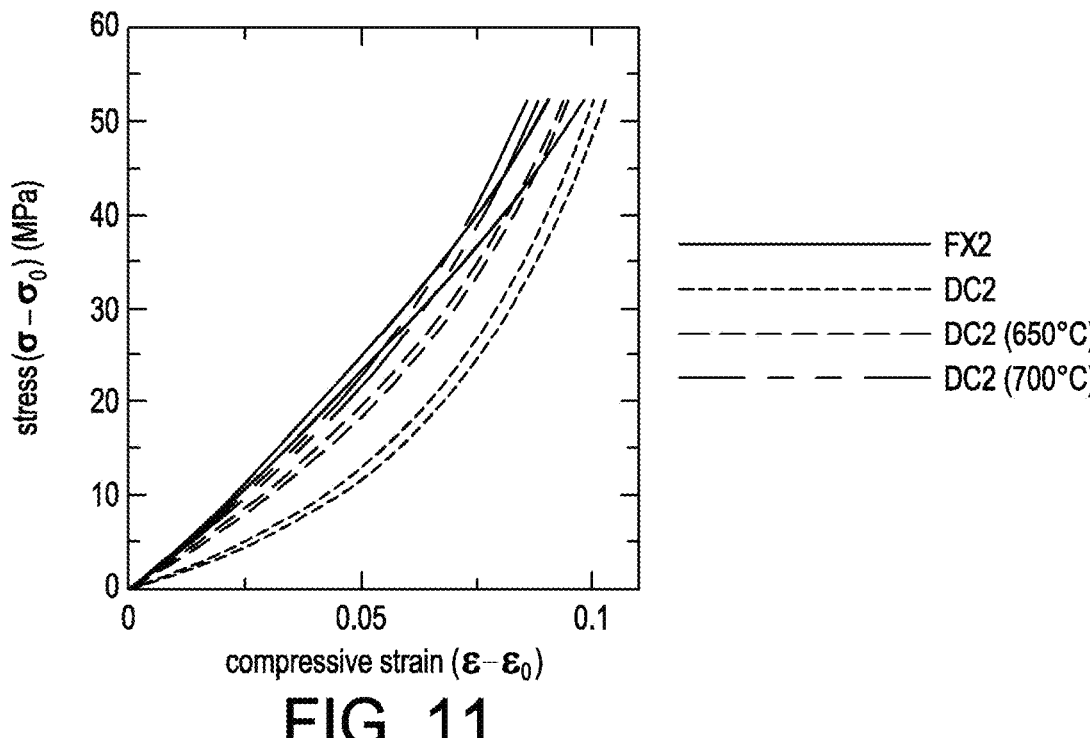
FIG. 11 shows a chart of stress-strain curves for various delayed coke 40/70 mesh samples, according to one or more aspects of the present disclosure.

In this Example, shot coke (representing delayed coke) samples described above were subjected to uniaxial compression using a pellet die compression test. Approximately 1 gram of each sample was loaded into a 0.5-inch diameter pellet die, and tamped down prior to compression in an INSTRON® (Norwood, MA) load frame. The samples were compressed at a rate of 0.15 millimeters per minute (mm/min) to 7500 Newton (N) (approximately 8600 psi). The stress-strain curves for various shot coke 40/70 mesh samples are shown in FIG. 11, where the curves have been shifted to the reference state at which the applied stress is 1000 psi. DC2 was 40/70 mesh and two DC2 samples were thermally post-treated at 650° C. and 700° C.; each were tested in duplicate. As shown in FIG. 11, the thermally post-treated DC2 samples demonstrated elevated compression (greater stiffness) compared to counterparts that were not thermally post-treated. Sample FX2 is a 40/70 mesh sample of flexicoke, which is shown for comparison. It can be seen that the overall compression behavior of the heat-treated shot coke (delayed coke) samples is very similar to that of the flexicoke sample.

Fracture Conductivity

In this Example, the fracture conductivities of 40/70 mesh samples of a shot coke (representing delayed coke) (DC2) were examined having various thermal post-treatments and/or fines removal (labeled "+fines removal" in FIGS. 12A and 12B) and compared to samples that were neither thermally treated nor having fines removal.

Fracture conductivity was determined using proppant packs sandwiched between Ohio sandstone cores with a proppant particulate loading of 1.7 lb/ft$^2$, unless otherwise indicated, of fracture surface. The system was allowed to relax under 1000 pounds per square inch (psi) of confining stress at 150° F. and the proppant pack permeability was measured by cross flowing a 2% aqueous KCl solution under a small pressure gradient. The permeability was multiplied by the pack height and reported as the fracture conductivity, as measured in mD-ft.

Figures 12A, 12B:
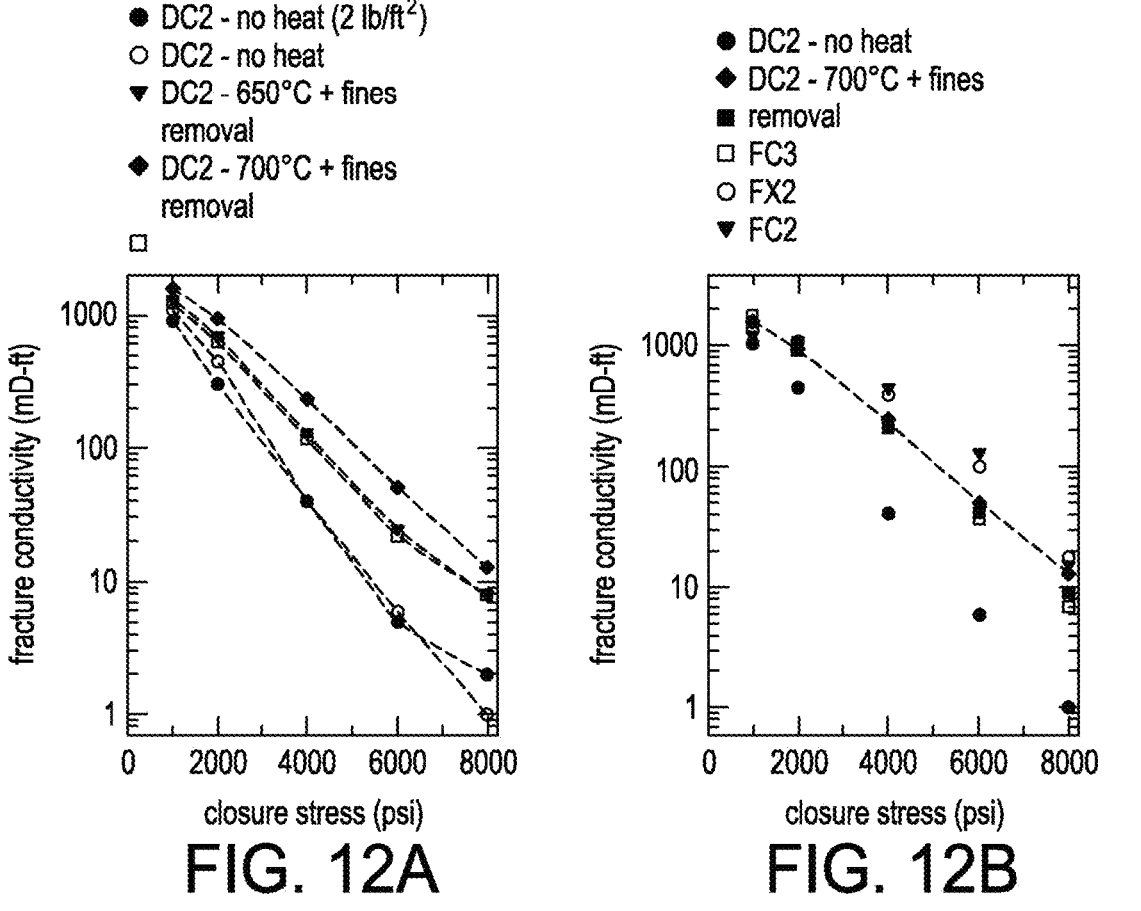
FIGS. 12A and 12B show charts of fracture conductivity results of delayed coke samples, fluid coke samples and flexicoke samples according to one or more aspects of the present disclosure.

During the testing, the applied stress (closure stress) was incremented in 2000 psi intervals from 1000 psi to 8000 psi, and the system was allowed to relax for 50 hours before determining the conductivity at the stress level of interest. FIG. 12A illustrates a chart representing the results of the fracture conductivities. As shown, the shot coke (DC2) that was thermally post-treated and was treated to remove fines exhibited greater conductivity compared to the baseline samples (having neither heat treatment nor fines removal). Moreover, even without fines removal, the thermally post-treated DC2 sample showed greater conductivity compared to the baseline samples.

As an additional comparison, the fracture conductivity of the shot coke sample treated at 700° C. and having fines removed (DC2—700° C.+fines removal) was compared to an untreated shot coke sample (DC2—no heat), three separate fluid coke type samples (FC1, FC2, and FC3), and a flexicoke sample (FX2). Fracture conductivity testing was carried out as described above at a loading of proppant particulate loading of 2 lb/ft$^2$ of fracture surface. The results are shown in FIG. 12B.

As shown in FIG. 12B, the thermally post-treated DC2 sample exhibited comparable performance to fluid coke and flexicoke, which are known to possess the mechanical properties necessary for performance as proppant.

Accordingly, the thermally post-treated delayed coke proppant particulates of the present disclosure are suitable for use in hydraulic fracturing operations.

As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A fracturing fluid comprising:
   a carrier fluid; and
   thermally post-treated delayed coke proppant particulates, wherein the thermally post-treated delayed coke proppant particulates comprise delayed coke that has been thermally post-treated to a temperature in a range of about 400° C. to about 1000° C. for a predetermined duration and ground to a predetermined average size diameter in either order.

2. The fracturing fluid of claim 1, wherein the predetermined duration is in a range of about 15 minutes to about 24 hours.

3. The fracturing fluid of claim 1, wherein the predetermined average size diameter is in a range of about 100 micrometers to about 600 micrometers.

4. The fracturing fluid of claim 1, wherein the thermally post-treated delayed coke proppant particulates have apparent density in a range of about 1.4 $g/cm^3$ to about 2.1 $g/cm^3$.

5. The fracturing fluid of claim 1, wherein the thermally post-treated delayed coke proppant particulates have a bulk density of less than about 0.7 $g/cm^3$.

6. The fracturing fluid of claim 1, wherein the thermally post-treated delayed coke proppant particulates have a reduced elastic modulus in a range of about 5 gigapascals to about 50 gigapascals.

7. The fracturing fluid of claim 6, wherein the thermally post-treated delayed coke proppant particulates have a hardness value in a range of about 1 gigapascal to about 4 gigapascals.

8. The fracturing fluid of claim 1, wherein the thermally post-treated delayed coke proppant particulates have a weight ratio of carbon to hydrogen of about 50:1 to about 120:1.

9. The fracturing fluid of claim 1, wherein the thermally post-treated delayed coke proppant particulates have a percent of degradables as determined by thermogravimetric analysis in a range of up to about 3%.

10. A method comprising: introducing the fracturing fluid of claim 1 into a subterranean formation.

11. The method of claim 10, further comprising prior to introducing the fracturing fluid into the subterranean formation, removing at least a portion of fines having an average particle size distribution of less than about 20 micrometers.

12. The method of claim 10, further comprising depositing at least a portion of the thermally post-treated delayed coke proppant particulates within one or more fractures in the subterranean formation to form a proppant pack.

13. The method of claim 10, wherein the predetermined duration is in a range of about 15 minutes to about 24 hours.

14. The method of claim 10, wherein the predetermined average size diameter is in a range of about 100 micrometers to about 600 micrometers.

15. The method of claim 10, wherein the thermally post-treated delayed coke proppant particulates have one or more of the following properties:
    (a) an apparent density in a range of about 1.4 $g/cm^3$ to about 2.1 $g/cm^3$,
    (b) a bulk density of less than about 0.7 $g/cm^3$, or
    (c) a reduced elastic modulus in a range of about 5 gigapascals to about 50 gigapascals.

16. The fracturing fluid of claim 1, wherein the delayed coke has been thermally post-treated to a temperature in a range of about 400° C. to about 800° C.

17. The fracturing fluid of claim 1, wherein the delayed coke has been thermally post-treated to a temperature in a range of about 400° C. to about 600° C.

18. The fracturing fluid of claim 1, wherein the delayed coke that has been thermally post-treated to a temperature in a range of about 600° C. to about 800° C.

19. The fracturing fluid of claim 1, wherein the predetermined duration ranges from 15 minutes to 15 hours.

20. The fracturing fluid of claim 1, wherein the predetermined duration ranges from 15 minutes to 5 hours.

21. The fracturing fluid of claim 1, wherein the predetermined duration ranges from 1 hour to 5 hours.

22. A fracturing fluid comprising:

a carrier fluid; and thermally post-treated delayed coke proppant particulates, wherein the thermally post-treated delayed coke proppant particulates comprise delayed coke that has been thermally post-treated and ground to have an average size diameter from about 100 micrometers to about 600 micrometers.

23. The fracturing fluid of claim 22, wherein the delayed coke has been thermally post-treated for a duration of about 15 minutes to about 24 hours.

24. The fracturing fluid of claim 22, wherein the thermally post-treated delayed coke proppant particulates have apparent density in a range of about 1.4 $g/cm^3$ to about 2.1 $g/cm^3$.

25. The fracturing fluid of claim 22, wherein the thermally post-treated delayed coke proppant particulates have a bulk density of less than about 0.7 $g/cm^3$, and wherein the delayed coke has a sulfur content in a range of about 1 weight percent (wt. %) to about 8 wt. %, a volatile matter content in a range of about 8 wt. % to about 15 wt. %, and a Hargrove grindability index in a range of about 30 to 130.

26. A fracturing fluid comprising:

a carrier fluid; and thermally post-treated delayed coke proppant particulates, wherein the thermally post-treated delayed coke proppant particulates have a bulk density of less than about 0.7 $g/cm^3$.

* * * * *